(12) United States Patent
Kobayashi et al.

(10) Patent No.: US 8,489,286 B2
(45) Date of Patent: Jul. 16, 2013

(54) VEHICLE OPERATION SUPPORTING DEVICE AND VEHICLE OPERATION SUPPORTING METHOD

(75) Inventors: Masahiro Kobayashi, Ebina (JP); Yasuhisa Hayakawa, Yokohama (JP); Kou Satou, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 320 days.

(21) Appl. No.: 12/817,844

(22) Filed: Jun. 17, 2010

(65) Prior Publication Data
US 2010/0324823 A1 Dec. 23, 2010

(30) Foreign Application Priority Data

Jun. 18, 2009 (JP) ................................. 2009-145244
Mar. 15, 2010 (JP) ................................. 2010-057213

(51) Int. Cl.
*B60R 22/00* (2006.01)
*B60Q 1/00* (2006.01)
*H04N 5/225* (2006.01)

(52) U.S. Cl.
USPC ............................. 701/45; 340/435; 348/169

(58) Field of Classification Search
USPC ................. 701/400–541, 300–302, 1, 28, 41, 701/42, 45, 36, 65, 93, 32.3, 70, 71, 72, 80, 701/11, 7, 119; 340/988–996, 436, 933, 435, 340/932.2; 348/148, 149, 169, 208.14
See application file for complete search history.

(56) References Cited

U.S. PATENT DOCUMENTS

| 5,483,453 A | 1/1996 | Uemura et al. | |
|---|---|---|---|
| 2003/0041831 A1* | 3/2003 | Aoki et al. | 123/179.4 |
| 2005/0125153 A1* | 6/2005 | Matsumoto et al. | 701/300 |

FOREIGN PATENT DOCUMENTS

| JP | 2005-041459 | * | 2/2005 |
|---|---|---|---|
| JP | 2005-125933 | | 5/2005 |
| JP | 2008-059052 | * | 3/2008 |
| JP | 2009-012493 | | 1/2009 |

* cited by examiner

*Primary Examiner* — Muhammad Shafi
(74) *Attorney, Agent, or Firm* — Young Basile

(57) ABSTRACT

When an obstacle on either of the two sides of a vehicle is detected, the future position of the vehicle after a prescribed time is predicted. When the future predicted vehicle position reaches a prescribed lateral position in the width direction of the lane, control start is determined such that obstacle avoiding control is carried out to prevent the approach of the vehicle to the obstacle. When an intention of the driver to enter the lane of the obstacle is detected, the start timing for obstacle avoiding control is shortened.

18 Claims, 11 Drawing Sheets

VEHICLE OPERATION SUPPORTING DEVICE AND VEHICLE OPERATION SUPPORTING METHOD

CROSS-REFERENCE TO RELATED APPLICATION

This application claims priority to Japanese Patent Application Serial Nos. 2009-1435244, filed Jun. 18, 2009, and 2010-057213, filed Mar. 15, 2010, each of which is incorporated herein in its entirety by reference.

TECHNICAL FIELD

The present invention pertains to a vehicle operation supporting device and a vehicle operation supporting method where, when an obstacle on one side of the vehicle is detected, operation of the vehicle is supported to prevent approach of the vehicle to the obstacle.

BACKGROUND

An example of a vehicle operation supporting device in the prior art is the technology described in Japanese Kokai Patent Application No. 2005-125933. According to that technology, the distance between an obstacle and the vehicle is detected, and the risk potential with respect to the obstacle is calculated corresponding to the detected distance. When a steering reactive force is generated based on the risk potential, the driver is warned about approach of the vehicle to the obstacle, and approach of the vehicle to the obstacle is prevented.

BRIEF SUMMARY

According to the technology described in Japanese Kokai Patent Application No. 2005-125933, however, when the driver intentionally operates the vehicle to enter the lane of the obstacle by carrying out a lane change operation or the like, and the vehicle approaches the obstacle, a certain time period exists between start of the lane change operation to notification, so the driver may feel a delay in the start of notification.

Embodiments of the present invention, in contrast, provide a vehicle operation supporting device and a vehicle operation supporting method that can decrease the feeling of discomfort to the driver and provide appropriate control with respect to the obstacle at the side of the vehicle.

For example, when an obstacle at the side of the vehicle is detected, the future position of the vehicle after a preset prescribed time is predicted. Upon detection that the vehicle may enter the lane of the obstacle based on the future predicted position of the vehicle, control start is determined, and obstacle avoiding control is carried out to prevent approach of the vehicle to the obstacle. In this case, when the intention of the driver to enter the lane of the obstacle is detected, the control start timing of the obstacle avoiding control is shortened.

As described, when the driver intends to enter the lane of the obstacle, the timing for the control start can be shortened. As a result, supporting control can be executed free of a feeling of discomfort of the driver.

Details of this embodiment and others are described hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In the embodiments, a rear-wheel drive vehicle that carries a vehicle operation supporting device will be explained. However, front-wheel drive vehicles and all-wheel drive vehicles may also adopt the vehicle operation supporting device of this invention.

First Embodiment

Figure 1:
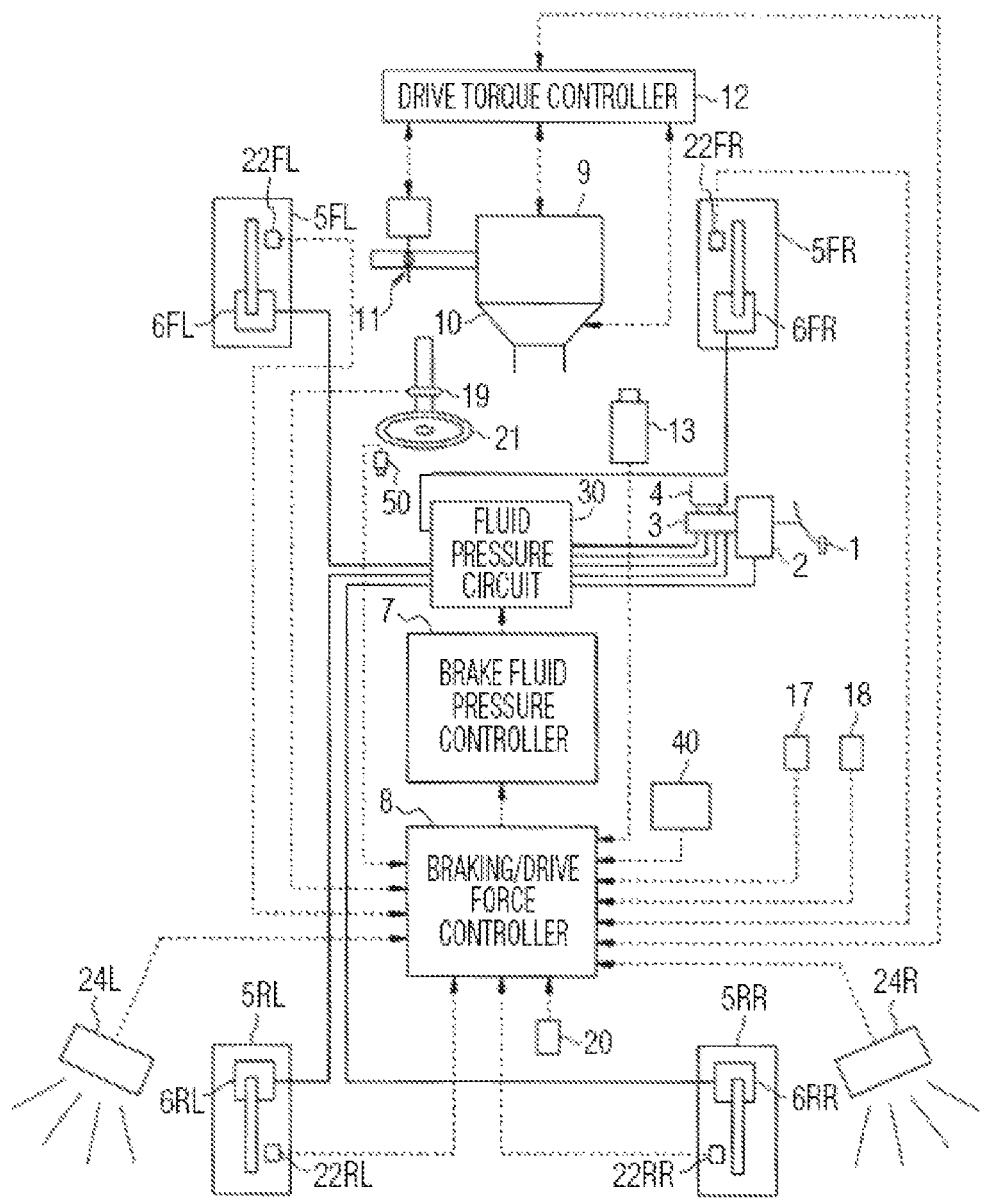
FIG. 1 is a schematic diagram illustrating a device pertaining to an embodiment of the present invention.

FIG. 1 is a schematic diagram illustrating the device in a first embodiment.

Brake pedal 1 is connected via booster 2 to master cylinder 3. In the figure, symbol 4 represents a reservoir.

Master cylinder 3 is connected via fluid pressure circuit 30 to wheel cylinders 6FL-6RR of the various wheels. As the driver steps on brake pedal 1 (in the absence of brake control), the brake hydraulic pressure is boosted by master cylinder 3 corresponding to the step-down distance of brake pedal 1. The boosted brake hydraulic pressure is fed via fluid pressure circuit 30 to wheel cylinders 6FL-6RR of wheels 5FL-5RR.

Brake fluid pressure controller 7 controls actuators in fluid pressure circuit 30, and the brake hydraulic pressures to the various wheels are individually controlled. Here, the brake hydraulic pressures to the various wheels are controlled to values corresponding to the instruction value from braking/drive force controller 8. The actuators are proportional solenoid valves that can control the various wheel cylinder hydraulic pressures to any brake hydraulic pressure.

Here, for example, brake fluid pressure controller 7 and fluid pressure circuit 30 may use the brake fluid pressure controllers adopted in, e.g., antiskid control (ABS), traction control (TCS) or a vehicle dynamics controller (VDC). Brake fluid pressure controller 7 may be configured to stand alone to control the brake hydraulic pressures of wheel cylinders 6FL-6RR. When a brake hydraulic pressure instruction value is input from braking/drive force controller 8, to be explained later, the various brake hydraulic pressures are controlled corresponding to the brake hydraulic pressure instruction value.

Also, drive torque controller 12 is arranged on this vehicle.

Drive torque controller 12 controls the driving torque to rear driving wheels 5RL, 5RR. This control is realized by controlling the operation state of engine 9, the selected gear ratio of automatic transmission 10, and the throttle opening of throttle valve 11. That is, drive torque controller 12 controls the fuel injection quantity and/or the ignition timing. At the same time, the throttle opening is controlled. As a result, the operation state of engine 9 is controlled.

Also, drive torque controller 12 outputs the value of driving torque Tw, the information in the control, to braking/drive force controller 8.

Note that drive torque controller 12 may be used alone in controlling the driving torque of rear wheels 5RL, 5RR. When a driving torque instruction value is input from braking/drive force controller 8, the torque of the driving wheels is controlled corresponding to the driving torque instruction value.

On the front portion of the vehicle, image pickup part 13 with an image processing function is attached. Here, image pickup part 13 is used to detect the position of the vehicle in the lane where the vehicle runs. For example, image pickup part 13 may be a monocular camera consisting of a CCD (Charge Coupling Device) camera.

Here, image pickup part 13 picks up the image ahead of the vehicle. Then, image pickup part 13 carries out image processing for the picked up image ahead of the vehicle. Thus, image pickup part 13 is a lane detection device that detects lane dividing lines (lane markers), and other lane defining lines, and detects the lane where the vehicle runs based on the detected lines, also called white lines herein.

In addition, based on the detected lane where the vehicle runs, image pickup part 13 calculates the angle formed between the lane of the vehicle and the front-to-back directional axis of the vehicle (yaw angle) $\phi_{front}$, lateral displacement $X_{front}$ with respect to the lane, curvature $\beta_{front}$ of the lane, etc. Here, image pickup part 13 outputs calculated yaw angle $\phi_{front}$, lateral displacement $X_{front}$, and curvature $\beta_{front}$ of the lane, etc., to braking/drive force controller 8.

Here, image pickup part 13 detects white lines as lane lines. Based on the detected white lines, it calculates yaw angle $\phi_{front}$. Consequently, yaw angle $\phi_{front}$ significantly depends on the detection precision of image pickup part 13.

Also, curvature $\beta_{front}$ of the lane can be calculated based on steering angle δ of steering wheel 21 to be explained later.

The vehicle also has radar devices 24L/R. Here, radar devices 24L/R are sensors for detecting obstacles on the left/right sides of the vehicle, respectively. Radar devices 24L/R are millimeter radars that emit electromagnetic waves at least to prescribed dead angle areas (regions) on the two sides of the vehicle, and detect reflected waves with respect to the emitted electromagnetic waves, so that they can detect the presence/absence of obstacle(s) in the prescribed dead angle areas (ranges). In the following, they are simply referred to as millimeter wave radar. Preferably, radar devices 24L/R can detect relative lateral position POSXobs, relative longitudinal position DISTobst and relative longitudinal velocity dDISTobst with respect to the obstacle for the left/right sides, respectively. Here, in the application examples of the present specification, the lateral direction refers to the width direction of the lane, and the longitudinal direction refers to the direction of extension (or travel) of the lane.

The vehicle has master cylinder pressure sensor 17, accelerator opening sensor 18, steering angle sensor 19, direction indicating switch 20 and wheel velocity sensors 22FL-22RR.

The master cylinder pressure sensor 17 detects the output pressure of master cylinder 3, that is, master cylinder hydraulic pressure Pm. Accelerator opening sensor 18 detects the step-down distance of the accelerator pedal, that is, the amount the accelerator pedal is depressed as accelerator angle θt. Steering angle sensor 19 detects the steering angle of steering wheel 21 (steering angle) δ. Direction indicating switch 20 detects a direction indicating operation by means of a direction indicator. Wheel velocity sensors 22FL-22RR respectively detect the rotation velocities of wheels 5FL-5RR, that is, the so-called wheel velocities Vwi (i=fl, fr, rl, rr). The detected signals of these sensors are output to braking/drive force controller 8.

In addition, navigation system 40 is carried on this vehicle. Navigation system 40 outputs road information together with route information, set based on the destination input by the driver, to braking/drive force controller 8.

Also, the vehicle has image pickup device 50 with an image processing function. Image pickup device 50 is used for detecting the viewing direction of the driver. Image pickup device 50 is a monocular camera consisting of, e.g., a CCD (Charge Coupling Device) camera.

Image pickup device 50 photographs the face of the driver. Here, image pickup device 50 carries out image processing on the image of the face to detect the viewing direction of the driver. In this case, the viewing direction of the driver may also be detected from the orientation of the face of the driver. Image pickup device 50 outputs the information indicating the viewing direction of the driver to braking/drive force controller 8 (obstacle avoiding controlling means).

Figure 2:
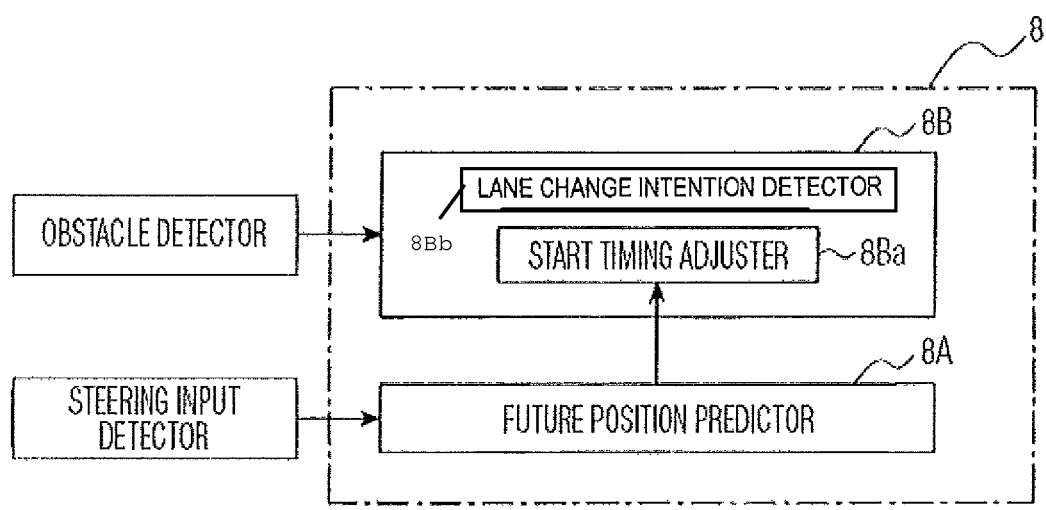
FIG. 2 is a schematic diagram illustrating the configuration of a controller.

FIG. 2 is a block diagram illustrating the configuration of braking/drive force controller 8.

As shown in FIG. 2, braking/drive force controller 8 has future position predictor 8A and control start determiner 8B. Also, control start determiner 8B has start timing adjuster (start timing adjustment means) 8Ba and lane change intention detector (intention detecting means) 8Bb. Controller 8 and the other controllers described herein, generally consist of a respective microcomputer including central processing unit (CPU), input and output ports (I/O) receiving certain data described herein, random access memory (RAM), keep alive memory (KAM), a common data bus and read only memory (ROM) as an electronic storage medium for executable programs and certain stored values as discussed herein. The functional (or processing) units of the controller 8 described herein such as future position predictor 8A and control start determiner 8B, could be, for example, implemented in software as the executable programs, or could be implemented in whole or in part by separate hardware in the form of one or more integrated circuits (IC). Controller 8 can be an engine control unit (ECU) as known in the art programmed as described herein. Other controllers described herein can be similarly structured. Also, although multiple controllers are shown, fewer or more are possible.

Based on the input of wheel steering of the driver detected by a wheel steering input detector, future position predictor 8A predicts the future position of the vehicle after passage of a forward fixed time Tt (=headway time).

When it is determined that an obstacle on the side of the vehicle is detected by obstacle detection means (here, radar devices 24L or 24R), control start determiner 8B determines the start of control of obstacle avoiding control by detecting that the future position (more specifically the lateral position) of the vehicle reaches a prescribed control start position (e.g., a lateral position in width direction of lane), or by detecting that the future position is located nearer the obstacle than the control start position. That is, the lane where the obstacle runs is defined as the moving path of the obstacle, and, when it is detected that the future position of the vehicle reaches the prescribed control start position, or the future position is located nearer the obstacle than the control start position, it is determined that the vehicle may enter the moving path of the obstacle, and start of the obstacle avoiding control is performed. Also, when lane change intention detector 8Bb detects that the driver intends to change to the adjacent lane on the side of the obstacle, start timing adjuster 8Ba compares the state with that when the driver does not intend to change lanes and determines a quicker control start. For example, by increasing forward fixed point time Tt, start timing adjuster 8Ba can shorten the start timing of control for preventing an approach to the obstacle. That is, when the future position of the vehicle after lapse of forward fixed point time Tt reaches the prescribed control start position, control start determiner 8B starts the obstacle avoiding control. Consequently, when start timing adjuster 8Ba lengthens forward fixed point time Tt, for an identical state of approach of the vehicle to the obstacle (the velocity and acceleration of the vehicle in approach in the width direction of the lane), the determination of when to start the obstacle avoiding control by means of control start determiner 8B is shortened.

When control start determiner 8B detects control start, braking/drive force controller 8 executes obstacle avoiding control. In the present embodiment, obstacle avoiding control is carried out by means of vehicle movement control (hereinafter to be referred to as control) that generates yaw moment Ms for controlling the vehicle in a direction for preventing approach to the obstacle and alarm generation control (hereinafter to be referred to as alarm) that generates an alarm to the driver before the vehicle movement control.

Figure 3:
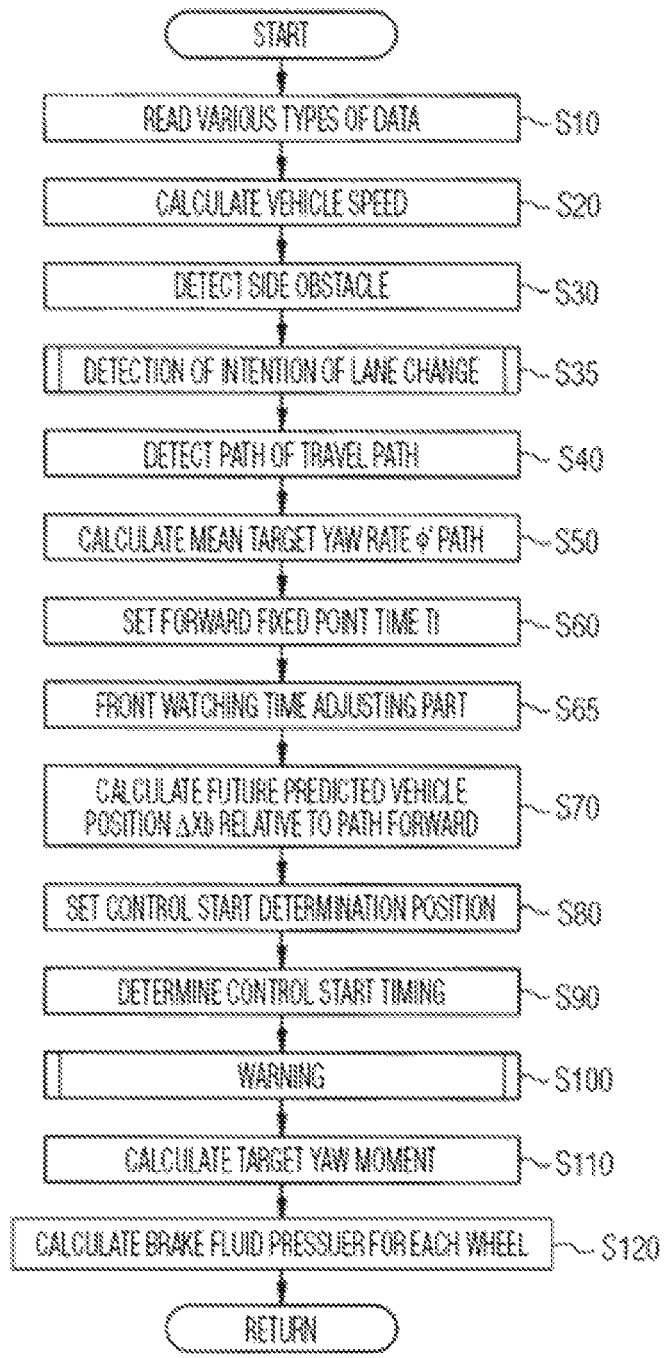
FIG. 3 is a flowchart illustrating the processing procedure of the controller in a first embodiment.

FIG. 3 is a flow chart illustrating the avoidance control processing procedure executed by braking/drive force controller 8.

This avoidance control processing is executed by means of one timer interruption each prescribed sampling time period ΔT (for example, once every 10 msec). Here, no communication processing is arranged in the processing shown in FIG. 3, and the information obtained by means of arithmetic and logic operation processing is refreshed and stored in a storage device at any time, and necessary information is read at any time from the storage device.

First, in step S10, braking/drive force controller 8 reads the various types of data from the various types of sensors, controllers, and control units. More specifically, it acquires various wheel velocities Vwi, steering angle δ, master cylinder hydraulic pressure Pm and the direction switching signal detected by the various sensors.

Then, in step S20, braking/drive force controller 8 calculates vehicle velocity V. Here, vehicle velocity V is calculated based on wheel velocities Vwi using the following listed equations:

$$V=(Vwrl+Vwrr)/2(:\text{with front-wheel drive}); \text{ or}$$

$$V=(Vwfl+Vwfr)/2(:\text{with rear-wheel drive}). \quad (1)$$

Here, Vwf1, Vwfr represent the wheel velocities of the left/right front wheels, respectively, and Vwr1, Vwrr represent the wheel velocities of the left/right rear wheels, respectively. That is, in equation (1), vehicle velocity V is the calculated mean value of the wheel velocities of the passive, or follower, wheels. In this embodiment, because the vehicle is a rear-wheel driving type, vehicle velocity V is calculated from the wheel velocity of the front wheels.

Also, when ABS (anti-lock brake system) control or another automatic brake control device is employed, the estimated vehicle velocity determined using such a brake controller is acquired and is used as vehicle velocity V.

Figure 4:
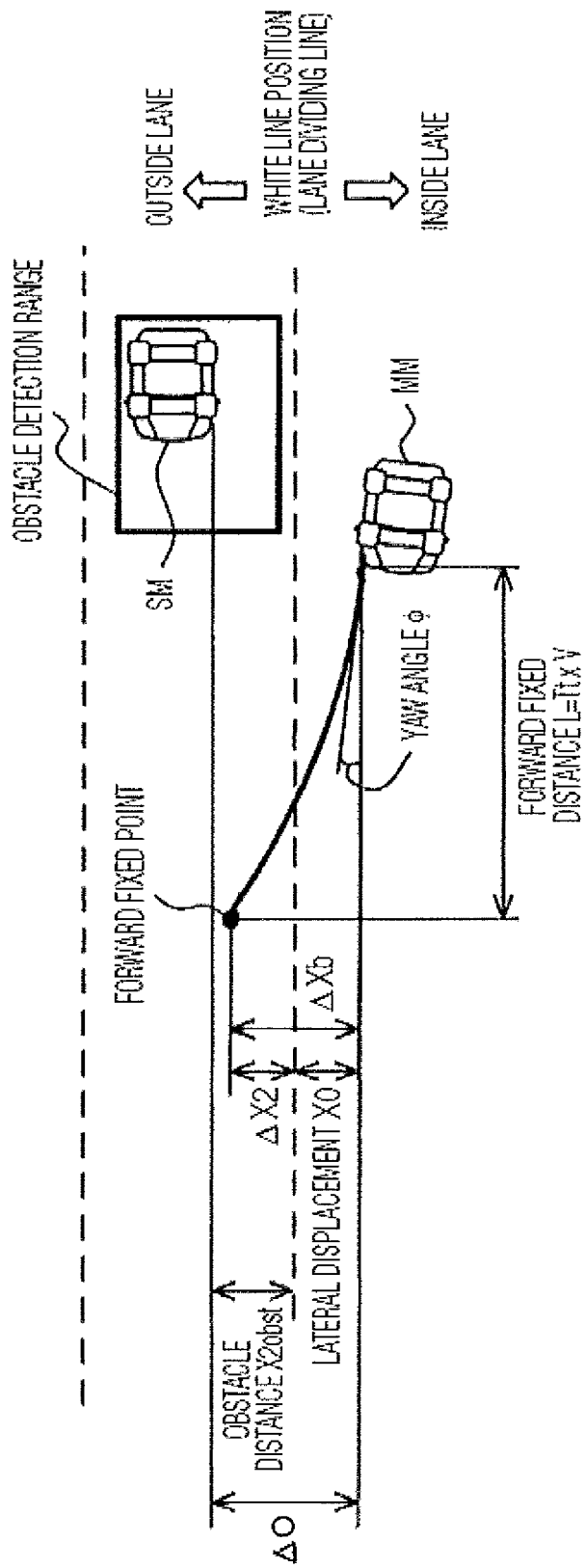
FIG. 4 is a pictorial representation of a vehicle having an inventive operation support device, illustrating the relationship between the vehicle and an obstacle.

In step S30, based on the signals from the left/right radar devices 24L/R, the presence/absence of obstacle SM is acquired for the left/right sides of vehicle MM. Also, when sensors with higher detection precision are in use, the relative position and relative velocity of obstacle SM on the side of vehicle MM are acquired. When describing the area monitored herein, as shown in FIG. 4, the "sides" of vehicle MM also include positions on the rear sides with respect to vehicle MM unless otherwise stated.

Then, in step S35, braking/drive force controller 8 carries out processing for detecting lane change intention, which indicates whether the driver intends to change to the adjacent lane on the side of obstacle SM.

Figure 5:
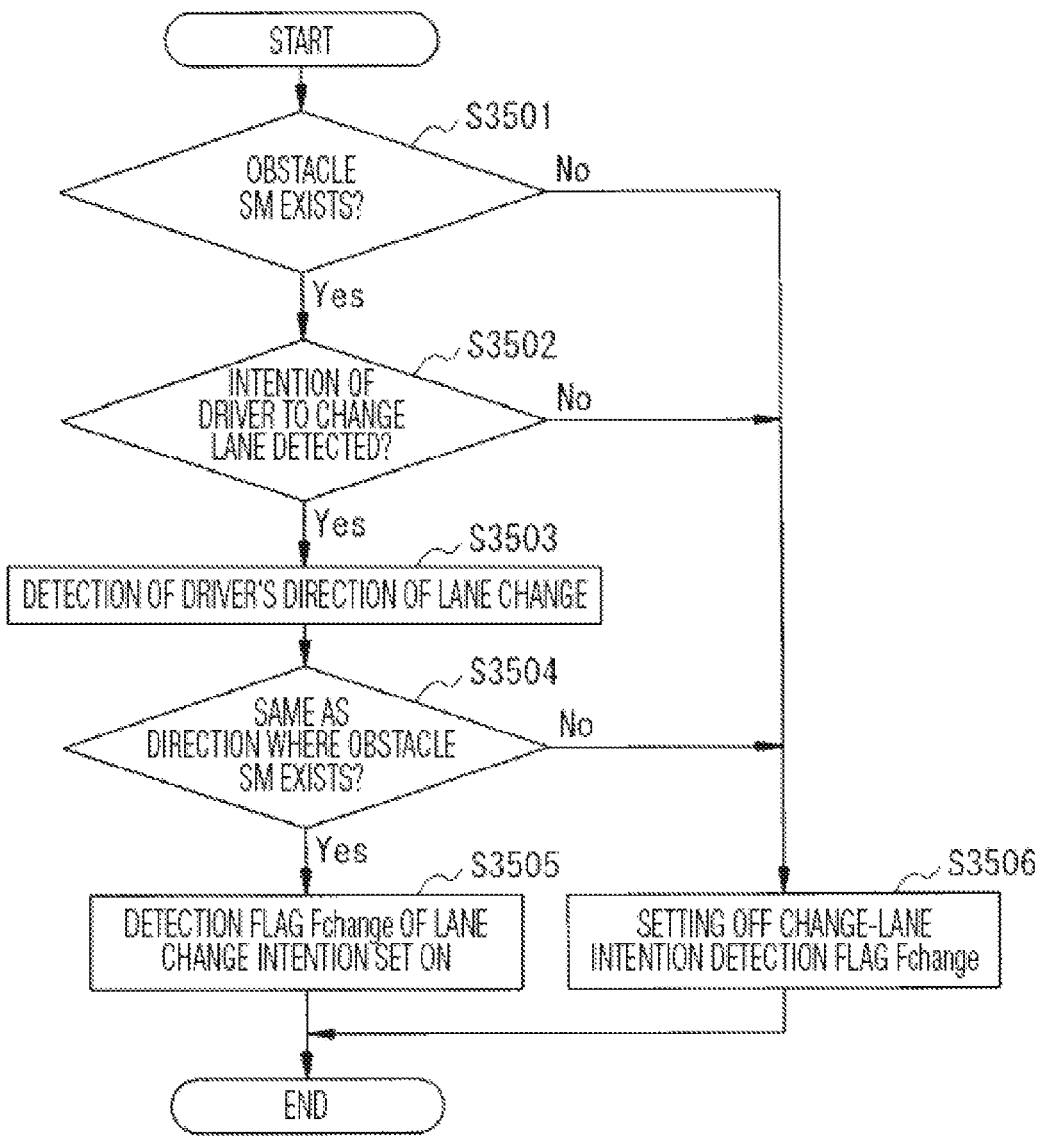
FIG. 5 is a flowchart illustrating the processing procedure for detecting an intention to change lanes.

FIG. 5 is a flow chart illustrating the lane change intention detection processing procedure executed in step S35.

First, in step S3501, braking/drive force controller 8 determines the presence/absence of obstacle SM. Here, when it is determined that obstacles SM are absent on both left/right sides of the vehicle, the flow goes to step S3506 to be explained later. On the other hand, when obstacle SM exists in at least one of the left/right sides of the vehicle, the flow goes to step S3502.

In step S3502, braking/drive force controller 8 determines whether the driver intends to change to the adjacent lane. In this embodiment, based on the signal from direction indicating switch 20, an intention of the driver to change lanes and the lane change direction are detected. If a direction indicating operation by the direction indicating switch 20 has not occurred, it is determined that the driver does not intend to change lanes, and the flow goes to step S3506.

On the other hand, if a direction indicating operation by the direction indicating switch 20 has occurred, it is determined that the driver intends to change lanes, and the flow goes to step S3503.

In step S3503, braking/drive force controller 8 detects the lane change direction of the driver based on the signal from direction indicating switch 20, and the flow goes to step S3504.

In step S3504, braking/drive force controller 8 determines whether the lane change direction of the driver detected in previous step S3503 is the same as the side where obstacle SM exists. If the lane change direction of the driver is not the same as the side where obstacle SM exists, the flow goes to step S3506.

On the other hand, if the lane change direction of the driver is the same as the side where obstacle SM exists, the flow goes to step S3505, lane change intention detection flag Fchange is set to ON, and lane change intention detection processing comes to an end.

In step S3506, braking/drive force controller 8 sets lane change intention detection flag Fchange OFF, and lane change intention detection processing comes to an end.

In the example above, the intention of the driver to change lanes and the lane change direction are detected based on the signal from direction indicating switch 20. In this scheme, the lane where the obstacle exists is defined as the moving path of the obstacle, and, when the driver intends to enter the lane where the obstacle exists, it is determined that the driver intends to enter the moving path of the obstacle. The method for judging that the driver intends to enter the moving path of the obstacle is not limited to this method. For example, the viewing direction of the driver from image pickup device 50 can be used to determine the driver's intention. Since there are known methods of how to determine the viewing direction of a driver from images, details are omitted from the discussion here.

Then, in step S40, braking/drive force controller 8 reads from image pickup part 13 the lateral displacement (lateral position) $X_{front}$ of vehicle MM in the lane in which it is now running and curvature $\beta_{front}$ of the lane.

Acquisition source of curvature $\beta_{front}$ of the lane is not limited to image pickup part 13. For example, it may also be acquired based on navigation system curvature information, etc., recorded at the vehicle's position.

Also, yaw angle $\phi_{front}$ of vehicle MM with respect to the lane where the vehicle now runs is calculated. This yaw angle $\phi_{front}$ is used in detecting the state of running in the lane.

In this embodiment, as yaw angle $\phi_{front}$, the measured value from image pickup part 13 is adopted.

Instead of the measured value obtained by image pickup part 13, yaw angle $\phi_{front}$ may also be calculated based on the lane dividing (white) line near the portion at which the image has been picked up by image pickup part 13. In this case, for example, the quantity of variation in lateral displacement $X_{front}$ of vehicle MM is used to calculate yaw angle $\phi_{front}$ using the following listed equation (2):

$$\phi_{front} = \tan^{-1}(dX'/V(=dX/dY)). \quad (2)$$

Here, dX represents the rate of variation of lateral displacement $X_{front}$ per unit time, dY represents the quantity of variation in the moving direction per unit time, and dX' represents the differential value of variation rate dX.

Also, when yaw angle $\phi_{front}$ is calculated based on the nearby white line, as shown in equation (2), the scheme is not limited to computing yaw angle $\phi_{front}$ using lateral displacement $X_{front}$. For example, one may also adopt a scheme in which the nearby detected white line is extended a great distance, and, based on the extended white line, yaw angle $\phi_{front}$ is calculated.

In step S50, braking/drive force controller 8 calculates mean target yaw rate $\phi'_{path}$, which is the yaw rate needed to maintain running of vehicle MM along a lane. Mean target yaw rate $\phi'_{path}$ becomes zero when the vehicle runs along a straight road. On the other hand, on a curved road, mean target yaw rate $\phi'_{path}$ varies depending on curvature $\beta_{front}$. Consequently, when mean target yaw rate $\phi'_{path}$ is calculated, curvature $\beta_{front}$ of the lane is used as shown by equation (3) below:

$$\phi'_{path} = \beta_{front} \cdot V \quad (3)$$

Here, mean target yaw rate $\phi'_{path}$ for maintaining the lane can also be calculated easily using mean value $\phi'_{ave}$ of yaw rate $\phi'$ in a prescribed period of time, or using the value obtained by multiplying yaw rate $\phi'$ by a filter with a large time constant.

In step S60, braking/drive force controller 8 sets forward fixed point time Tt.

Here, forward fixed point time Tt is a prescribed time for determining a threshold for predicting the state of approach to obstacle SM by the driver. For example, forward fixed point time Tt may be set at 1 sec.

Then, target yaw rates $\Psi_{driver}$ and $\Psi_{driverhosei}$ are calculated.

Here, target yaw rate $\Psi_{driver}$ is calculated from steering angle $\delta$ and vehicle velocity V using the following listed equation. This target yaw rate $\Psi_{driver}$ is a target yaw rate generated corresponding to wheel steering as follows:

$$\Psi_{driver} = Kv \cdot \delta \cdot V; \text{ wherein} \quad (4)$$

Kv represents a gain.

In addition, target yaw rate $\Psi_{driverhosei}$ is calculated using the following equation. The value of this target yaw rate $\Psi_{driverhosei}$ is obtained by subtracting mean target yaw rate $\phi'_{path}$ needed for running in the lane from target yaw rate $\Psi_{driver}$. As a result, it is possible to remove the influence of wheel steering for running along a curved road.

$$\Psi_{driverhosei} = \Psi_{driver} - \phi'. \quad (5)$$

Then, in step S65, braking/drive force controller 8 adjusts forward fixed point time Tt set in step S60.

Here, the processing for adjusting forward fixed point time Tt is classified according to lane change intention detection flag Fchange set in step S35.

Namely, when lane change intention detection flag Fchange=OFF, it is determined that the driver does not intend to change to the adjacent lane on the side of obstacle SM. Alarm-generation adjustment gains αWL, αWR and adjustment control gains αCL, αCR are set at "1", respectively, and the flow goes to step S70 to be described later. In this case, correction of forward fixed point time Tt is not carried out.

When lane change intention detection flag Fchange=ON, it is determined that the driver intends to change to the adjacent lane on the side of obstacle SM. Alarm-generation adjustment gains αWL, αWR and adjustment control gains αCL, αCR are set using the following method.

Figure 6:
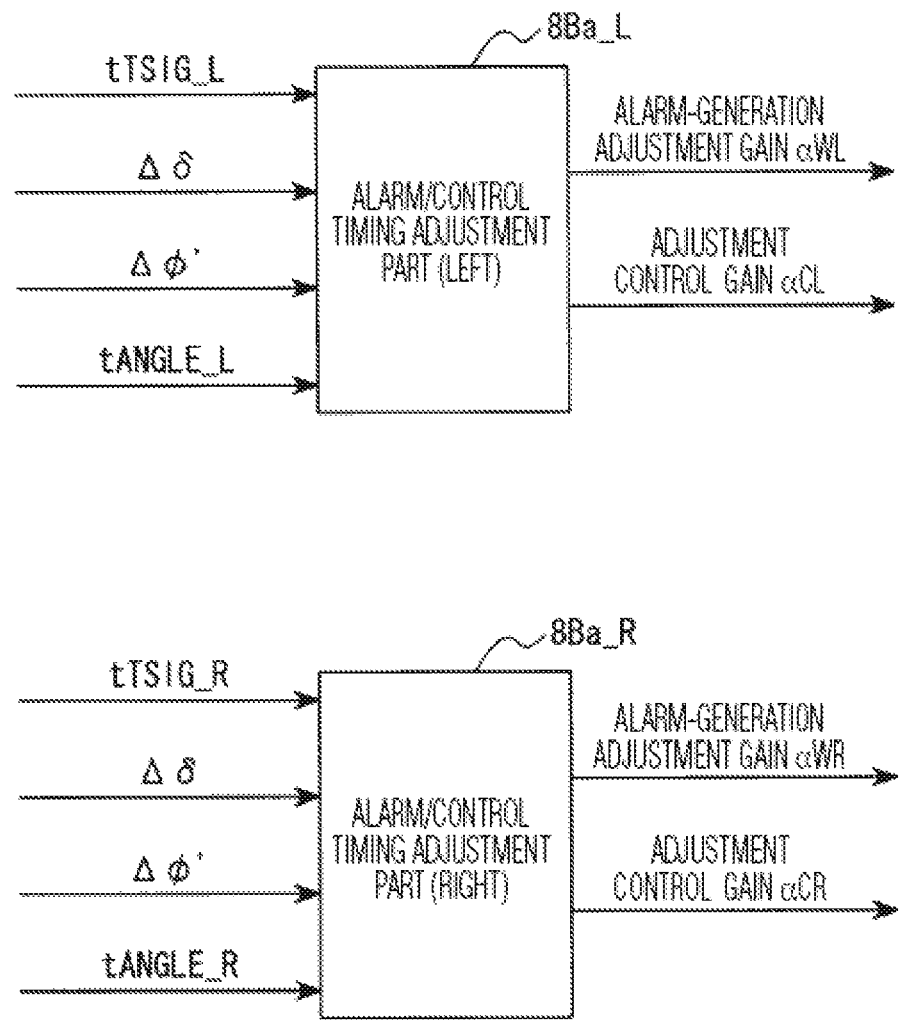
FIG. 6 is a block diagram illustrating computation of adjustment gain.

FIG. 6 is a block diagram illustrating control, and it shows the concept of computing the forward fixed point time Tt adjustment gain.

As shown in FIG. 6, tTSIG_L, Δδ, δφ' and tANGLE_L are input to alarm/control timing adjustment arithmetic and logic operation part (left) 8Ba_L, which outputs alarm-generation adjustment gain αWL and adjustment control gain αCL.

Here, tTSIG_L is the time from detection of a direction indicating operation to the left side by the direction indicator. The longer the time tTSIG_L, the larger the probability that the driver intends to change lanes. In other words, time tTSIG_L indicates the probability of detected intention of the driver to change lanes.

Δδ represents the quantity of variation of the steering angle operation (δ-δ0), and it has a positive value when the direction is to the right. δ0 represents a reference steering angle. Reference steering angle δ0 may be a value after carrying out filtering processing with a large time constant, or it may be a steering angle calculated from the curvature of the road and the velocity of the vehicle. Here, the larger the variation |Δδ| of the steering angle operation, the larger the probability that the driver intends to change lanes.

In addition, Δφ' represents the quantity of change in the yaw rate (φ'-φ0), and it has a positive value when the direction is to the right. Here, φ'0 represents a reference yaw rate, and it may have a value after filtering processing with a large time constant, or it may be a steering angle calculated from the curvature of the road and the velocity of the vehicle. Here, the larger the change of the yaw rate |Δφ'|, the larger the probability that the driver intends to change lanes.

Also, tANGLE_L refers to the time when the viewing direction of the driver falls below a prescribed lane change determination angle (<0, left direction). Here, the longer the time tANGLE_L, the larger the probability that the driver intends to change lanes.

Figure 7:
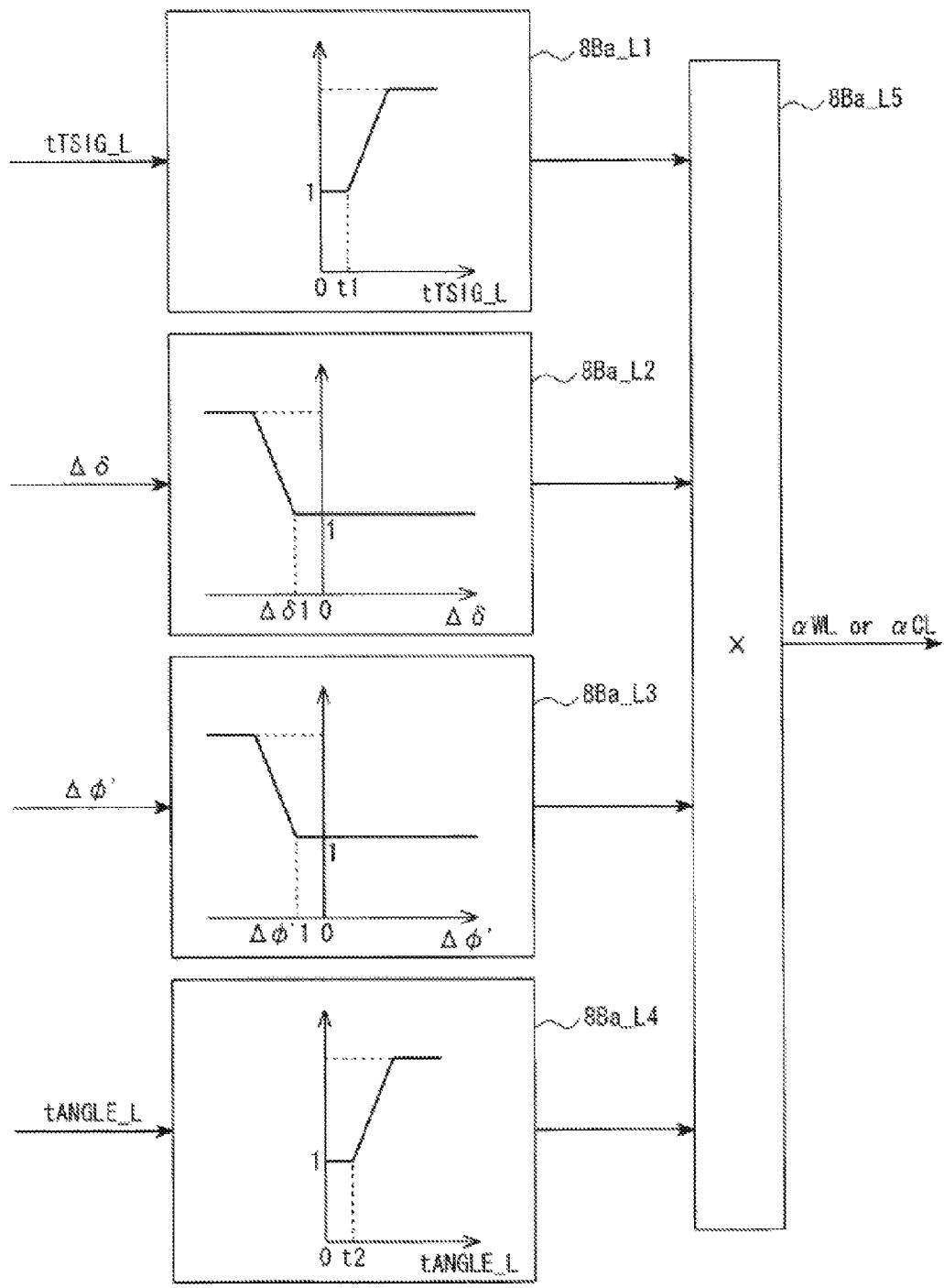
FIG. 7 is a block diagram illustrating a specific configuration of an alarm-control timing adjustment arithmetic and logic operation part when the obstacle is to the left of the vehicle.

FIG. 7 is a block diagram illustrating a specific configuration of alarm/control timing adjustment arithmetic and logic operation part (left) 8Ba_L of FIG. 6.

Based on tTSIG_L from detection of the direction indicating operation, first gain computing part 8Ba_L1 calculates first adjustment gains αWL1 and αCL1 with reference to a first adjustment gain computing map.

Here, for the first adjustment gain computing map, the ordinate represents first adjustment gain αWL1 or αCL1, and the abscissa represents time tTSIG_L. Until time tTSIG_L becomes prescribed time t1, αWL1 (or αCL1)=1 is set, and, in the region beyond prescribed time t1, the larger the value of tTSIG_L, the larger the first adjustment gains αWL1 and αCL1 are set.

Based on steering angle operation variation quantity Δδ, second gain computing part 8Ba_L2 takes a second adjustment gain computing map as reference in computing second adjustment gains αWL2 and αCL2.

Here, the ordinate of second adjustment gain computing map represents second adjustment gain αWL2 or αCL2, and the abscissa represents steering angle operation variation quantity Δδ. Gain αWL2 (or αCL2)=1 is set until the leftward steering angle operation variation quantity Δδ becomes prescribed quantity Δδ1, and, in the region where Δδ is smaller than prescribed quantity Δδ1, the smaller the value of Δδ (the larger the value of |Δδ|, the larger the value of second adjustment gains αWL2 and αCL2. Also, when variation occurs in the steering angle in the rightward direction (Δδ>0), αWL2 (or αCL2)=1 is set.

Third gain computing part 8Ba_L3 calculates third adjustment gains αWL3 and αCL3 based on yaw rate variation amount Δϕ' and with reference to a third adjustment gain computing map.

Here, the ordinate of third adjustment gain computing map represents third adjustment gain αWL3 or αCL3, and the abscissa represents yaw rate variation amount Δϕ'. Gain αWL3 (or αCL3)=1 is set until the leftward yaw rate variation amount Δϕ' becomes prescribed quantity Δϕ'1, and, in the region where Δϕ' is smaller than prescribed quantity Δϕ'1, the smaller the value of Δϕ' (the larger the value of |Δϕ'|), the larger the value of third adjustment gains αWL3 and αCL3. Also, when variation occurs in the steering angle in the rightward direction (Δϕ'>0), αWL3 (or αCL3)=1 is set.

Fourth gain computing part 8Ba_L4 calculates fourth adjustment gains αWL4 and αCL4 based on time tANGLE_L when the viewing direction of the driver is less than the lane change determination angle.

Here, the ordinate of the fourth adjustment gain computing map represents fourth adjustment gain αWL4 or αCL4, and the abscissa represents time tANGLE_L. Gain αWL4 (or αCL4)=1 is set until time tANGLE_L becomes prescribed time t2, and, in the region where tANGLE_L is beyond prescribed time t2, the larger the value of tANGLE_L, the larger the value of fourth adjustment gains αWL4 and αCL4.

An upper limit value is set for each of first through fourth gains αWL1-αWL4 and αCL1-αCL4 as shown in the gain computing maps of FIG. 7.

First through fourth adjustment gains αWL1-αWL4 and αCL1-αCL4 are input to adjustment gain output part 8Ba_L5, which outputs alarm-generation adjustment gain αWL and adjustment control gain αCL. Here, by integrating first through fourth adjustment gains αWL1-αWL4, respectively, alarm-generation adjustment gain αWL is calculated, and, by integrating first through fourth adjustment gains αCL1-αCL4, respectively, adjustment control gain αCL is calculated.

Similarly, alarm-generation adjustment gain αWR and adjustment control gain αCR are set higher when time tTSIG_R is longer, when rightward steering angle operation variation quantity Δδ is larger, when rightward yaw rate variation quantity Δϕ' is larger, and when time tANGLE_R is longer. Here, time tANGLE_R refers to the time after the viewing direction of the driver exceeds the prescribed lane change determination angle (>0: rightward direction).

By means of the following listed equations, forward fixed point time Tt is adjusted, and the flow goes to step S70:

TtL←Tt·αCL; and

TtR←Tt·αCR.  (6)

In this way, when the driver intends to change to the adjacent lane on the same side as the obstacle, compared with the case in which the driver does not intend to change lanes, alarm-generation adjustment gains αWL, αWR and adjustment control gains αCL, αCR are calculated to be larger, so that forward fixed point times TtL, TtR become longer. In this case, the larger the probability of the driver's intention to change lanes, the larger the various adjustment gains.

Referring again to FIG. 3, in the following step S70, using following equation (7), braking/drive force controller 8 uses forward fixed point time Tt adjusted in step S65 to calculate the vehicle's predicted position ΔXb in the lateral direction after forward fixed point time Tt with respect to the current position on the road. This vehicle's predicted position ΔXb is also used in judging whether the vehicle has left the road and has changed lanes. That is, vehicle's predicted position ΔXb is used in judging whether avoiding control has been started with respect to obstacle SM. The vehicle's predicted position ΔXb is calculated as follows:

$$\Delta Xb = (K1\phi + K2\phi m + K3\phi m'); \text{ wherein} \quad (7)$$

ϕ is the yaw angle;
ϕm is the target yaw angular velocity; and
ϕm' is the target yaw angular acceleration.

Target yaw angular velocity ϕm is represented by the following equation:

$$\phi m = \Psi_{driverhosei} \cdot Tt. \quad (8)$$

In addition, target yaw angular acceleration ϕm' is represented by the following equation:

$$\phi m' = \phi m \cdot Tt2. \quad (9)$$

Here, in order to represent vehicle's predicted position ΔXb in the dimension of the yaw angle, the following formula using forward fixed distance L can be employed:

$$\Delta Xb = L \cdot (K1\phi + K2\phi m \cdot T + K3\phi m' \cdot Tt^2). \quad (10)$$

The following relationship exists between forward fixed distance L and forward fixed point time Tt:

$$L = Tt \cdot V. \quad (11)$$

Based on such characteristics, the value of set gain K1 becomes a function of the vehicle velocity V. Also, the value of set gain K2 becomes a function of the vehicle velocity V and the forward fixed point time Tt. The value of set gain K3 becomes a function of the vehicle velocity T and the square of the forward fixed point time ($Tt^2$).

The predicted position of vehicle MM could also be calculated by individually determining the steering angle component and the steering velocity component followed by selecting high for them as shown:

$$\Delta Xb = \max(K2\phi m, K3f\phi m'). \quad (12)$$

Then, in step S80, braking/drive force controller 8 sets the determination threshold for start of control. This determination threshold determines whether avoiding control with respect to obstacle SM on the side is started.

In the present embodiment, as shown in FIG. 4, ΔO is taken as the control start determination threshold. ΔO is the relative lateral distance between vehicle MM and obstacle SM detected by means of radar devices 24L/R.

When lateral relative distance ΔO between vehicle MM and obstacle SM cannot be correctly determined, obstacle distance X2obst is set as the control start determination threshold. Here, obstacle distance X2obst is set by assuming the presence of a virtual obstacle SM at a prescribed distance in the lateral direction with reference to the position of the white line.

This obstacle distance X2obst is 0 when the assumed position of the virtual obstacle is the white line. Obstacle distance X2obst has a positive value when the assumed position is outside the white line, and it has a negative value when the assumed position is inside the white line.

Also, the preset threshold Xthresh may be set as the control start determination threshold. This threshold Xthresh is a value for presetting the distance of the future position of the vehicle MM from the current position of the vehicle MM.

Here, one uses an X-Y coordinate system in which the Y-axis is the direction along the road (longitudinal direction), and X-axis is the direction perpendicular to the road, that is, the width direction of the lane (lateral direction). Then, the lateral position of obstacle SM on the X-axis coordinate is detected. Based on this lateral position, the lateral relative distance ΔO is determined.

The obstacle detection region for detection of obstacle SM is set at prescribed a longitudinal/lateral position on the side of vehicle MM. Also, for the longitudinal position, the obstacle detection region becomes larger as the relative velocity between obstacle SM vehicle MM increases.

Then, in step S90 of FIG. 3, braking/drive force controller 8 executes determination of start of control.

Here, when the following relationship is met, a decision to start control is made:

$$\Delta Xb \geq \Delta O. \tag{13}$$

When obstacle distance X2obst is used as the determination threshold for control start, the control start decision is made when the following relationship is met:

$$\Delta X2 = \Delta Xb - XO \geq X2\text{obst}. \tag{14}$$

That is, as shown in FIG. 4, whether lateral distance ΔX2 between the white line and the future predicted vehicle position of vehicle MM is over obstacle distance X2obst is determined. When the condition of equation (14) is met, an operation of changing lane to the side of obstacle SM is the conclusion, and control start is determined with respect to obstacle SM. When control start is determined with respect to obstacle SM, obstacle avoiding control determination flag Fout_obst is set ON. On the other hand, when the condition of equation (14) is not met, obstacle avoiding control determination flag Fout_obst is set OFF.

When preset threshold Xthresh is used as the determination threshold for control start, when the following relationship is met, control start is determined:

$$\Delta Xb \geq X\text{thresh}. \tag{15}$$

Here, in this embodiment, the vehicle's future predicted vehicle position ΔXb is determined for the left side and right side of the vehicle, respectively, to get ΔXbL/ΔXbR, and the determination of whether or not to start control is carried out individually for each.

The obstacle is not limited to vehicles on the sides of vehicle MM, such as vehicle SM. It also includes vehicles running in adjacent lanes in the opposite direction towards the vehicle.

Here, when determining whether future predicted vehicle position ΔXb is below the determination threshold, one may have hysteresis of F so that ΔX2<ΔO−F. That is, one may set a blind zone between the control intervention threshold and the control end threshold.

Also, Fout_obst may be set ON when Fout_obst is OFF. As the condition for setting Fout_obst to ON, one may add a condition of time, such as after the passage of a prescribed time after setting Fout_obst to OFF. In addition, after the passage of a prescribed time Tcontrol since determination of Fout_obst=ON, one may have Fout_obst=OFF and terminate control.

In addition, during execution of obstacle avoiding control, control execution direction Dout_obst is determined according to the determination direction of the future predicted position. When the future predicted vehicle position is the left side, one has Dout_obst=LEFT, and, when it is the right side, one has Dout_obst=RIGHT.

Here, when antiskid control (ABS), traction control (TCS) or vehicle dynamics controller (VDC) is employed, obstacle avoiding control determination flag Fout_obst is set OFF. This is to prevent operation of obstacle avoiding control during operation of the automatic brake control of these systems.

This determination method is tantamount to an operation in which a threshold is set for each of yaw angle φ, steering angle δ and steering velocity δ', and, as the thresholds approach obstacle SM, determination of control start timing becomes less likely. This is because target yaw angular acceleration φm' is determined from the relationship of the steering angle (with the vehicle velocity) as defined by equations commonly used.

Then, in step S100, braking/drive force controller 8 carries out processing for generating a warning. The warning is generated before arrival to the position of control start based on the forward fixed point time.

First, forward fixed point time Tt for control used in detection in step S90 is multiplied by a prescribed gain Kbuzz (>1) so that it becomes longer, and, at the same time, it is multiplied by alarm-generation adjustment gains αWL, αWR set in step S65. As a result, forward fixed point time TtL for the left-side alarm becomes Tt·Kbuzz·αWL, and forward fixed point time TtR for the right-side alarm becomes Tt·Kbuzz·αWR.

Here, (Tt·Kbuzz·αWL) or (Tt·Kbuzz·αWR) is used to generate an alarm when it is determined that the forward fixed point (i.e., the future position of the vehicle TtL or TtR) calculated using equation (6) has reached the position of control start as determined in step S90.

Then, in step S110, braking/drive force controller 8 sets yaw moment Ms.

When obstacle avoiding control determination flag Fout_obst is OFF, yaw moment Ms is set at 0, and the flow then goes to step S120.

On the other hand, when obstacle avoiding control determination flag Fout_obst is ON, yaw moment Ms is calculated using the following equation, and the flow then goes to step S120:

$$Ms = K1\text{recv} \cdot K2\text{recv} \cdot \Delta Xs; \text{ and} \tag{16}$$

$$\Delta Xs = (K1\text{mon} \cdot \phi + K2\text{mon} \cdot \phi m).$$

Figure 8:
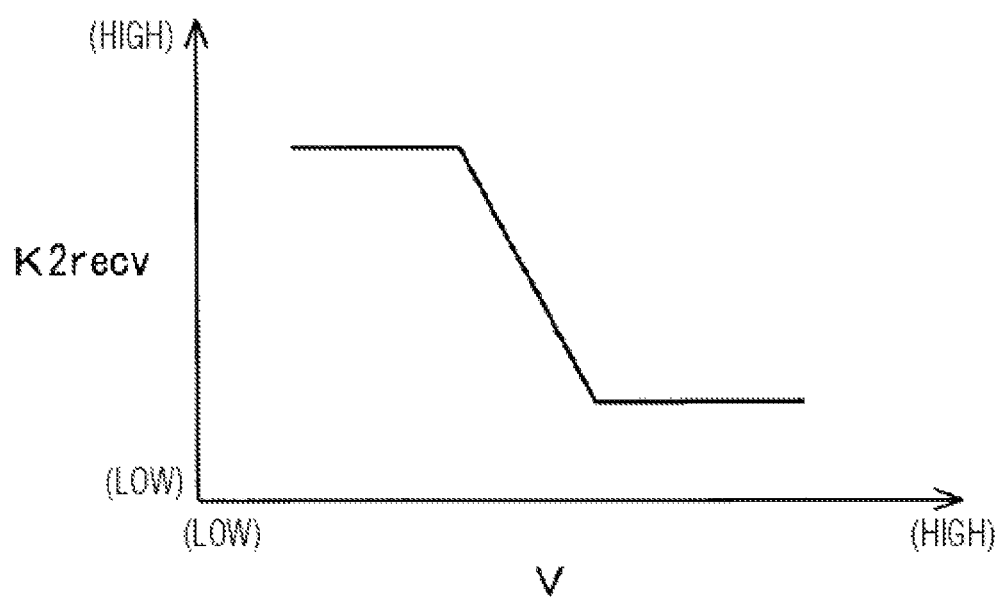
FIG. 8 is a graph illustrating the characteristics of gain K2recv.

Here, K1recv is a proportional gain (yawing moment of inertia) determined from the various parameters of the vehicle. K2recv represents a gain that varies corresponding to vehicle velocity V. FIG. 8 is a diagram illustrating an example of gain K2recv. As shown in FIG. 8, for example, gain K2recv has a larger value in the lower velocity region, and, when vehicle velocity V increases to a certain value, gain K2recv has a inversely proportional relationship with vehicle velocity V. Finally, when vehicle velocity V reaches a certain level, gain K2recv becomes a small, constant value. Also, the set value of gain K1mon is a function of the vehicle velocity V. In addition, the set value of gain K2mon is a function of the vehicle velocity V and the forward fixed point time Tt.

According to equation (16), yaw moment Ms increases when yaw angle φ with the white line and the yaw rate generated in steady state due to steering with more lane change by the driver increase.

Alternatively, yaw moment Ms may be calculated using equation (17) below. This equation (17) is tantamount to what is obtained by multiplying equation (16) by a gain K3 (=1/$Tt^2$). This gain K3 decreases when forward fixed point time Tt becomes longer.

$$Ms = K1recv \cdot \Delta Xb/(L \cdot Tt^2). \quad (17)$$

The following result is obtained by using equation (17) that indicates the length of time (control time) T that the yaw angle is under control. That is, when forward fixed point time Tt of the control start timing becomes shorter by setting control time T to agree with forward fixed point time Tt, control time T for correcting the vehicle becomes shorter. As a result, the control quantity increases. That is, even when forward fixed point time Tt becomes shorter, the control quantity when control starts increases. Also, the control quantity decreases when forward fixed point time Tt becomes longer. As a result, control can be executed with the least feeling of discomfort of the driver corresponding to the specific state and independent of set forward fixed point time Tt.

Note that the setting of Fout_obst is a prediction of change in the future moving path based on steering information.

One may also adopt the following scheme. When a tendency for the vehicle to get outside the current lane is detected, a yaw moment is generated towards the interior of the lane on the vehicle, so that escape of the vehicle from the lane can be prevented. In this lane escape preventing control scheme, whether formal control is started or lane escape prevention control is started (Fout_LDP=1), the control that is started first is taken as priority, and the other control is not executed until termination of that control.

In step S120, braking/drive force controller 8 calculates an instruction for generating yaw moment Ms for avoiding the obstacle, and, after the output of this instruction, control returns to the initial processing.

Here, in the present embodiment, as a means for generating yaw moment Ms to avoid the obstacle, an example of generation of the yaw moment using the brake driving force will be explained in the following.

When a steering reactive force controller is adopted as the means for generating the yaw moment, a reactive force may be generated with steering reactive force Frstr taken as Frstr=Ka·Ms. Here, Ka represents a coefficient for converting yaw moment Ms to a steering reactive force, and it can be determined beforehand in experiments, etc.

Also, when a steering controller is used as the means for generating the yaw moment, steering angle STRθ may be provided to the steering where STRθ=Kb·Ms. Here, Kb represents a coefficient for converting yaw moment Ms to a steering angle, and it can be determined beforehand in experiments, etc.

Alternatively, the steering controller may be used as the means for generating the yaw moment, and its steering force (steering torque) may be determined as STRtrg=Kc·Ms. Here, Kc represents a coefficient for converting yaw moment Ms to a steering force, and it can be determined beforehand in experiments, etc.

When yaw moment Ms is 0, that is, when a determination result for no execution of yaw moment control is obtained, as indicated by following listed equations (18) and (19), brake hydraulic pressures Pmf, Pmr are taken as target brake hydraulic pressures Psi (i=fl, fr, rl, rr) of the various wheels:

$$Psfl = Psfr = Pmf; \text{ and} \quad (18)$$

$$Psrl = Psrr = Pmr. \quad (19)$$

Here, Pmf represents the brake hydraulic pressure for the front wheels, and Pmr represents the brake hydraulic pressure for the rear wheels and has a value calculated based on the front-wheel brake hydraulic pressure Pmf in consideration of the front/rear distribution. For example, when the driver depresses the brake pedal, brake hydraulic pressures Pmf, Pmr become values corresponding to the distance that the brake pedal is depressed (and thus corresponding to the master cylinder hydraulic pressure Pm).

On the other hand, when the absolute value of yaw moment Ms is larger than 0, that is, when a determination result is to start obstacle avoiding control, the following processing is carried out.

Namely, based on target yaw moment Ms, front wheel target brake hydraulic pressure difference ΔPsf and rear wheel target brake hydraulic pressure difference ΔPsr are calculated. More specifically, target brake hydraulic pressure differences ΔPsf, ΔPsr are calculated using following listed equations (20) and (21) below:

$$\Delta Psf = 2 \cdot Kbr \cdot (Ms \cdot FRratio)/T; \text{ and} \quad (20)$$

$$\Delta Psr = 2 \cdot Kbr \cdot (Ms \times (1 - FRratio))/T; \text{ wherein} \quad (21)$$

FRratio is a set threshold value;
T is tread; and
Kbf and Kbr are conversion coefficients for the front wheels and rear wheels when the brake force is converted to brake hydraulic pressure.

Note that, for convenience, tread T is assumed to be the same for both the front wheels and the rear wheels. Kbf and Kbr are determined according to various parameters/specifications of the brake.

In this way, corresponding to the magnitude of target yaw moment Ms, the brake forces generated at the wheels are distributed. That is, prescribed values are given to target brake hydraulic pressure differences ΔPsf, ΔPsr, and a brake force difference is generated between the left/right wheels for the front wheels and the rear wheels, respectively. Here, the calculated target brake hydraulic pressure differences ΔPsf, ΔPsr are used to calculate the final target brake hydraulic pressures Psi (i=fl, fr, rl, rr).

More specifically, when the control execution direction Dout_obst is LEFT, that is, when obstacle avoiding control is executed for obstacle SM on the left side, equation (22) is used to calculate target brake hydraulic pressures Psi (i=fl, fr, rl, rr) of the various wheels as shown below:

$$Psfl = Pmf;$$

$$Psfr = Pmf + \Delta Psf;$$

$$Psrl = Pmr; \text{ and}$$

$$Psrr = Pmr + \Delta Psr/ \quad (22)$$

On the other hand, when control execution direction Dout_obst is RIGHT, that is, when obstacle avoiding control is executed for obstacle SM on the right side, equation (23) is used to calculate target brake hydraulic pressures Psi (i=fl, fr, rl, rr) of the various wheels as shown below:

$$Psfl = Pmf + \Delta Psf;$$

$$Psfr = Pmf;$$

$Psr1 = Pmr + \Delta Psr;$ and $Psrr = Pmr.$ (23)

By means of equations (22) and (23), a brake driving force difference between the left/right wheels is generated.

Here, as shown in equations (22) and (23), brake operation by the driver, that is, brake hydraulic pressures Pmf, Pmr, is considered to calculate target brake hydraulic pressures Psi (i=fl, fr, rl, rr) of the various wheels.

Braking/drive force controller 8 outputs target brake hydraulic pressures Psi (i=fl, fr, rl, rr) of the various wheels calculated as mentioned previously as brake hydraulic pressure instruction values to brake fluid pressure controller 7.

In the following, the operation of the first embodiment will be explained.

First, an intention of the driver to change to the adjacent lane on the side of the obstacle is detected (step S35 in FIG. 3). In this case, if there is no intention of the driver to change lanes, lane change intention detection flag Fchange is set to OFF, so that alarm-generation adjustment gains αWL, αWR and adjustment control gains αCL, αCR are set at "1". Also, forward fixed point time Tt remains at a preset reference value (forward fixed point time Tt set in step S60) (step S65).

Then, based on yaw angle φ and yaw angular velocity φm indicating the running state of the vehicle, future predicted vehicle position ΔXb of the vehicle after forward fixed point time Tt is calculated (step S70). Here, when the vehicle goes towards the side of the obstacle due to an oversight by the driver or for another reason, future predicted vehicle position ΔXb calculated using the alarm-generation forward fixed point time (Tt·Kbuzz) becomes larger than ΔO, and an alarm is generated for the driver (step S100). Then, if the driver still does not correct the driving direction of the vehicle, and future predicted vehicle position ΔXb calculated using controlling forward fixed point time Tt exceeds ΔO, supporting control for avoiding the obstacle is started (step S90).

When it is decided to start supporting control, based on the future predicted vehicle position ΔXb of the vehicle, target yaw moment Ms is calculated as a control quantity (step S110), and the brake driving force is controlled so that target yaw moment Ms is generated (step S120). As a result, the vehicle is controlled in the direction to prevent approach to the obstacle.

On the other hand, if the driver intends to change to the adjacent lane on the side of the obstacle, lane change intention detection flag Fchange is set to ON, so that each of alarm-generation adjustment gains αWL, αWR and adjustment control gains αCL, αCR exceeds unity. In this case, the higher the probability that the driver intends to change lanes, the larger the values of alarm-generation adjustment gains αWL, αWR and adjustment control gains αCL, αCR.

Consequently, in this case, forward fixed point time Tt becomes longer than a prescribed reference value (forward fixed point time Tt set in step S60) (step S65). Then, based on this corrected forward fixed point time Tt, future predicted vehicle position ΔXb of the vehicle is calculated (step S70). Because forward fixed point time Tt is increased by correction, the forward fixed point becomes farther from the current position. As a result, alarm and control can be started more easily (i.e., earlier) in this case.

In contrast to the present embodiment, when the forward fixed point time Tt is not corrected, forward fixed point time Tt becomes a fixed value regardless of whether the driver intends to change to the lane on the same side as the obstacle. That is, control start timing is the same independent of the intention of the driver to change lanes. However, in both the case in which the driver intends to change to the lane on the same side as the obstacle and the case in which the vehicle moves toward the obstacle due to oversight by the driver or for another reason, because the control start timing is the same, the driver may have a feeling of discomfort upon activation of the supporting control. More specifically, when the driver intentionally approaches the obstacle by changing lanes to the adjacent lane on the side of the obstacle, the driver knows the time from the start of lane change to start of control, so that compared with the case in which the vehicle approaches the obstacle without an intention of lane change, the driver feels that the control start timing is delayed, and the driver may have a feeling of discomfort.

On the other hand, in the present embodiment, when the driver intends to change to the adjacent lane on the same side as the obstacle, forward fixed point time Tt is set longer with respect to a reference value. That is, compared with the case in which the driver does not intend to change lanes, the supporting control is started more easily.

In this way, by having a shorter control start timing, the driver's discomfort can be alleviated.

Also, the higher the probability that the driver intends to change lanes, the larger the degree of shortening of the control start timing, so supporting control can be started with a reduced feeling of discomfort of the driver.

As shown in FIG. 1, either or both radar devices 24L/R form a side obstacle detector. In FIG. 3, step S35 refers to the operation of the lane change intention detecting means 8Bb; step S70 refers to the operation of the future position predictor 8A; steps S65 and S100 refer to the operation of the start timing adjuster 8Bb; and steps S90, S110 and S120 refer to other operations of the control for avoiding obstacles of braking/drive force controller 8.

The effects of the first embodiment are described below.

(1) The side obstacle detector detects an obstacle present on a side of the vehicle. The future position predictor predicts the future position of the vehicle after a preset time. The obstacle avoiding control works as follows. In the state in which an obstacle is detected with the side obstacle detector, control start is determined when the future position of the vehicle predicted with the future position predictor reaches a prescribed lateral position in the width direction of the lane, and obstacle avoiding control is carried out to prevent approach of the vehicle to the obstacle. The intention of the driver to change lanes is detected.

When the lane change intention is detected such that the intention of the driver is to enter the lane of the obstacle, the start timing adjuster compares the state with that when there is no intention of the driver to change lane, and the control start timing of the obstacle avoiding control is made shorter.

In this way, when the intention of the driver to enter the lane of an obstacle is detected, a comparison is made with the case where the driver does not intend to change lanes, and the control start timing for control to prevent approach to the obstacle is shortened. As a result, when the driver intentionally approaches an obstacle by changing lanes, the feeling of delay in the control start timing can be suppressed.

Consequently, control start causing of discomfort to the driver can be suppressed, while approach to the obstacle can be appropriately prevented.

(2) The start timing adjuster can shorten the control start timing by increasing the prescribed time period used to predict the future position of the vehicle.

As a result, the timing of control start can be shortened in a relatively simple way.

(3) When it is detected that the driver intends to change lanes, the probability that the driver intends to change lanes is determined. By means of the start timing adjuster, the higher the probability that the driver intends to change lanes, the shorter the control start timing.

As a result, the driver's discomfort can be alleviated in a reliable way.

(4) In one example, that the driver intends to change lanes is detected based on a direction indicating operation detected by the direction indicating switch.

As a result, the intention of the driver to change lanes can be detected in a reliable way.

(5) When an obstacle is detected on one side of the vehicle, the future position of the vehicle after a prescribed time is predicted, and, when the future predicted vehicle position of the vehicle reaches a prescribed lateral position in the width direction of the lane, control start is performed so that obstacle avoiding control is carried out to prevent approach of the vehicle to the obstacle. In this case, when the intention of the driver to enter the lane of the obstacle is detected, compared with the case in which the intention of the driver to change lanes is not detected, the control start timing of the obstacle avoiding control is shortened.

Consequently, control start with a feeling of discomfort to the driver can be suppressed, and approach of the vehicle to the obstacle can be appropriately prevented.

Second Embodiment

Different from the first embodiment in which forward fixed point time Tt is adjusted to adjust the control start timing, in the second embodiment, future predicted vehicle position ΔXb of the vehicle is adjusted to adjust the control start timing.

The basic configuration of the second embodiment is the same as that of the first embodiment.

Figure 9:
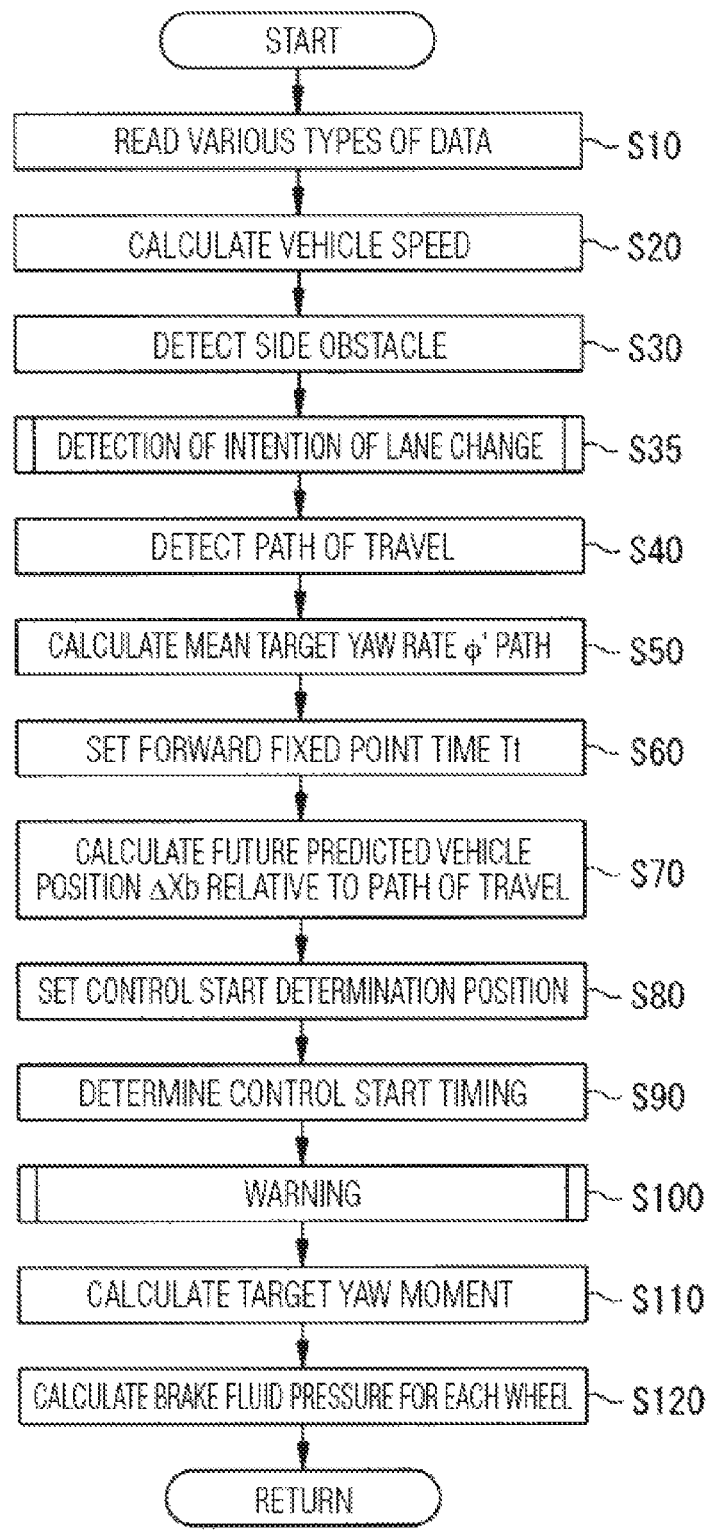
FIG. 9 is a flowchart illustrating the processing procedure of a braking/drive force controller in a second and third embodiment.

FIG. 9 is a flow chart illustrating the avoid control processing procedure executed by braking/drive force controller 8 in the second embodiment.

According to the avoiding control processing shown in FIG. 9, the avoiding control processing shown in FIG. 3 is modified, specifically the processing of step S65 is deleted, and the processing of steps S70 and S100 is changed. Otherwise, the operation is carried out in the same way as in the avoiding control processing shown in FIG. 3. Consequently, in the following, the features that are different in the processing between FIG. 3 and FIG. 9 will be explained.

In step S70, braking/drive force controller 8 calculates future predicted vehicle position ΔXb of the vehicle.

Here, the processing for computing future predicted vehicle position ΔXb of the vehicle is classified according to lane change intention detection flag Fchange set in step S35.

When it is determined that the driver does not intend to enter the lane of obstacle SM based on lane change intention detection flag Fchange (that is, when Fchange=OFF), future predicted vehicle position ΔXb of the vehicle is calculated as in the first embodiment, and the flow goes to step S80. That is, future predicted vehicle position ΔXb of the vehicle is calculated using one of equations (7), (10) and (12).

When it is determined that the driver intends to enter the lane of obstacle SM based on lane change intention detection flag Fchange (that is, when Fchange=ON), the following method is adopted to set adjustment gains αWL1-αWL3, αWR1-αWR3 and adjustment control gains αCL1-αCL3, αCR1-αCR3.

Just as in the first embodiment, the various adjustment gains are larger than 1. The higher the probability that the driver intends to enter the lane of the obstacle, the larger the values are set.

Here, set gains K1, K2, K3 multiplied by adjustment control gains αCL1-αCL3, αCR1-αCR3 are used, and, using any of equations (7), (10) and (12), leftward future predicted vehicle position ΔXbL of the vehicle and rightward future predicted vehicle position ΔXbR are calculated.

That is, for computing future predicted vehicle position ΔXbL, set gains K1-K3 determined using the following equations are used:

$K1=K1 \cdot \alpha CL1;$ $K2=K2 \cdot \alpha CL2;$ and $K3=K3 \cdot \alpha CL3.$ (24)

Also, for computing future predicted vehicle position ΔXbR, set gains K1-K3 determined using the following equations are used:

$K1=K1 \cdot \alpha CR1;$ $K2=K2 \cdot \alpha CR2;$ and $K3=K3 \cdot \alpha CR3.$ (25)

In step S100, braking/drive force controller 8 carries out the processing of alarm generation.

First, prescribed gain Kbuzz (>1) is applied so that the control start timing becomes longer than forward fixed point time Tt used in step S90.

Then, (Tt·Kbuzz) and set gains K1, K2, K3 multiplied by adjustment gains αWL1-αWL3, αWR1-αWR3 are used with equation (7) to calculate leftward future predicted vehicle position ΔXbL and rightward future predicted vehicle position ΔXbR of the vehicle.

That is, set gains K1-K3 determined using the following equations are used in computing future predicted vehicle position ΔXbL:

$K1=K1 \cdot \alpha WL1;$ $K2=K2 \cdot \alpha WL2;$ and $K3=K3 \cdot \alpha WL3.$ (26)

Also, for computing future predicted vehicle position ΔXbR, set gains K1-K3 determined using the following equations are used:

$K1=K1 \cdot \alpha WR1;$ $K2=K2 \cdot \alpha WR2;$ and $K3=K3 \cdot \alpha WR3.$ (27)

An alarm is generated when it is determined that the forward fixed point calculated as mentioned previously reaches the position of control start in step S90.

In the following, the operation of the second embodiment will be explained.

In this embodiment, it is assumed that the driver intends to enter the lane on the side of obstacle SM. In this case, the values of the alarm-generation adjustment gains and the adjustment control gains are larger than unity. Here, the adjustment gains are used to calculate future predicted vehicle position ΔXb of the vehicle (steps S70, S100). In this case, compared with the case in which the driver does not intend to change lanes, the future predicted point is changed to be further on the side of the obstacle. Consequently, the alarm and control start timing are shortened, and the driver's discomfort can be alleviated.

In FIG. 9, steps S70 and S100 form the start timing adjuster.

This embodiment has the following effect.

(6) By correcting the future position of the vehicle predicted by the future position predictor to the side of the obstacle in the width direction of the lane, the start timing adjuster shortens the control start timing.

As a result, the control start timing can be shortened in a relatively simple way.

Third Embodiment

In the following, the third embodiment of the present invention will be explained.

Different from the first and second embodiments, in which forward fixed point time Tt and future predicted vehicle position ΔXb of the vehicle are adjusted to adjust the control start timing, respectively, in the third embodiment the comparison determination threshold is adjusted to adjust the control start timing.

The basic configuration of the third embodiment is the same as mentioned previously for the first and second embodiments.

In the third embodiment, braking/drive force controller 8 executes the avoiding control processing shown in FIG. 9 with changes to the processing in certain steps.

More specifically, this avoiding control processing is the same as the avoiding control processing in the second embodiment except that the processing in steps S80 and S100 is different from that in the second embodiment. Consequently, explanation here will be focused mainly on the different features of the processing.

In step S80, braking/drive force controller 8 sets the determination threshold for starting control.

Here, the setting of lateral-direction relative distance ΔO between vehicle MM and obstacle SM as the determination threshold depends on lane change intention detection flag Fchange set in step S35.

When it is determined that the driver does not intend to enter the lane of obstacle SM based on lane change intention detection flag Fchange (that is, when Fchange=OFF), just as mentioned in the first embodiment, distance ΔO is set, and the flow goes to step S90. That is, distance ΔO becomes the detected value of radar devices 24L/R.

When it is determined that the driver intends to enter the lane of obstacle SM is detected based on lane change intention detection flag Fchange (that is, when Fchange=ON), the following method is adopted to set alarm-generation adjustment gains αWL, αWR and adjustment control gains αCL, αCR.

Different from the first and second embodiments, the values of the various adjustment gains are made smaller than unity (that is, its absolute value is less than one). The various adjustment gains are set such that the higher the probability that the driver intends to enter the lane of the obstacle, the smaller the values of the gains.

Distance ΔO is adjusted using adjustment control gains αCL, αCR, and the flow goes to step S90. Here, distance ΔOL as the leftward determination threshold and distance ΔOR as the rightward determination threshold are calculated using the following equations.

$$\Delta OL \leftarrow \Delta OL \cdot \alpha CL; \text{ and}$$

$$\Delta OR \leftarrow \Delta OL \cdot \alpha CR. \tag{28}$$

In step S100, braking/drive force controller 8 generates a warning.

First, multiplication by prescribed gain Kbuzz (>1) occurs so that the adjusted forward fixed point time Tt becomes longer than forward fixed point time Tt for use in detection in step S90.

Then, (Tt·Kbuzz) is used to calculate leftward future predicted vehicle position ΔXbL of the vehicle and rightward future predicted vehicle position ΔXbR of the vehicle. When it is determined that the forward fixed point calculated in this way reaches the position of control start calculated using the following equation, a warning is generated:

$$\Delta OL \leftarrow \Delta OL \cdot \alpha WL \text{ and}$$

$$\Delta OR \leftarrow 66 \, OL \cdot \alpha WR. \tag{29}$$

Also, when obstacle distance X2obst is set as the control start determination threshold, obstacle distance X2obst is multiplied by alarm-generation adjustment gains αWL, αWR and adjustment control gains αCL, αCR, and the alarm and control start timing can be shorter.

Also, when preset threshold Xthresh is set as the control start determination threshold, the threshold Xthresh is multiplied by alarm-generation adjustment gains αWL, αWR and adjustment control gains αCL, αCR, and the alarm and control start timing can be shorter.

In the following, the operation of the third embodiment will be explained.

In this embodiment, it is assumed that the driver intends to change to the adjacent lane on the same side as the obstacle. In this case, the values of the alarm generation adjustment gains and the adjustment control gains are smaller than unity. Then, the adjustment gains are used to calculate lateral-direction relative distance ΔO between the vehicle and the obstacle as the determination threshold for control start (steps S80, S100). In this case, the determination threshold for control start is adjusted toward the side opposite the obstacle as compared with the case when the driver does not intend to change lanes. Consequently, a shorter alarm and controlling start timing can be obtained, and the feeling of discomfort of the driver can be alleviated.

In FIG. 9, steps S80 and S100 form the start timing adjuster.

This embodiment has the following effect.

(7) The start timing adjuster shortens the control start timing by correcting the prescribed lateral position in the width direction of the lane toward the side opposite the obstacle in the width direction of the lane.

As a result, the control start timing can be shortened in a relatively easy way.

Next, modified examples of the embodiments are described.

In the embodiments previously described, a case has been explained in which when the driver intends to change to the lane on the same side as the obstacle, the control start timing is shortened for vehicle movement control and alarm generation control. However, one may also adopt a scheme in which only the timing of determination of start of alarm generation control is shortened. In this case, αCL=1, αCR=1, and αWL and αWR are set corresponding to the probability of a lane change. As a result, when the driver intends to change to the lane on the same side as the obstacle, as compared to the case in which the driver does not intend to change lanes, the timing of generation of an alarm can be shorter, so that the driver's discomfort can be alleviated.

When the start timing is shortened for both vehicle movement control and alarm generation control, vehicle movement control is started earlier, so that even if the lane change is stopped at an intermediate point, vehicle movement control is switched on so that the driver may feel discomfort. However, by generating only the alarm earlier, the driver's discomfort can be alleviated.

Also, in the described embodiments, one may adopt a scheme in which when the driver intends to change to the adjacent lane on the side of the obstacle, as compared to the case in which the driver does not intend to change lanes, the time from activation of alarm generation control to activation of vehicle movement control is shortened. In this case, alarm-generation adjustment gains αWL, αWR and adjustment control gains αCL, αCR may be set such that the quantity for shortening the control start timing for vehicle movement control is larger than the quantity for shortening the control start timing for alarm generation control. More specifically, in the first and second embodiments, one may adopt a scheme in which adjustment control gains αCL, αCR are set larger than alarm-generation adjustment gains αWL, αWR, and, in the third embodiment, one may adopt a scheme in which adjustment control gains αCL, αCR are set smaller than alarm-generation adjustment gains αWL, αWR. As a result, the driver's discomfort in case of lane change can be efficiently alleviated.

Relatedly, one may adopt a scheme in which only the timing of determination of control start for vehicle movement control is shortened so that the time from activation of alarm generation control to activation of vehicle movement control can be shortened. In this case, alarm-generation adjustment gains αWL=1, αWR=1, and adjustment control gains αCL, αCR may be set corresponding to the probability that the driver intends to change lanes.

In the these embodiments, one may also adopt a scheme in which, after it is determined that obstacle avoiding control is started, a control start inhibiting means is used to inhibit operation of control for a prescribed time (for example, about 200 ms). In this case, first, control inhibition times Tmask_L, Tmask_R are calculated corresponding to the probability that the driver intends to change lanes.

Figure 10:
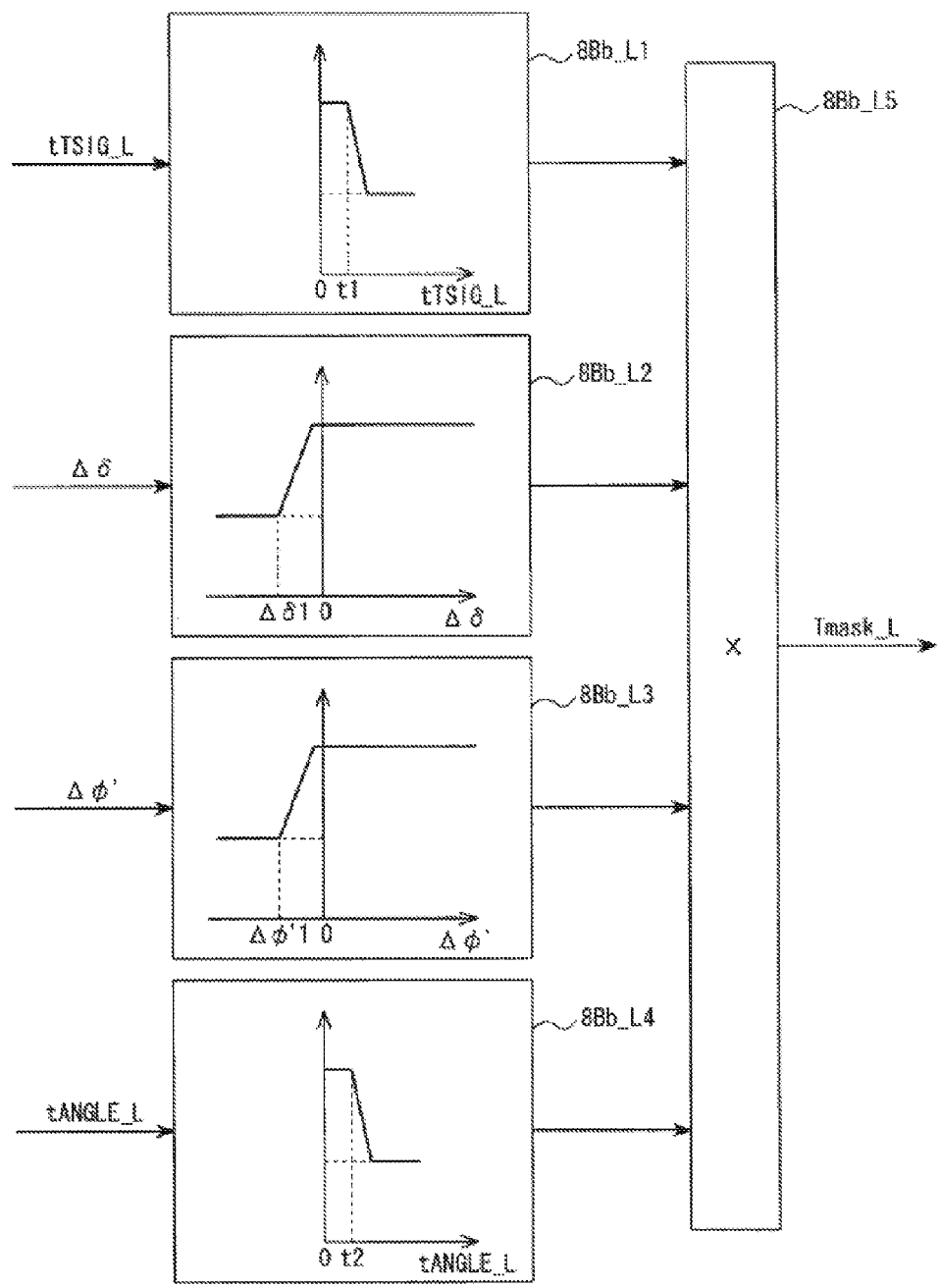
FIG. 10 is a block diagram illustrating the inhibition time computation method.

FIG. 10 is a block diagram illustrating a method for computing control inhibition time Tmask_L in this variation.

First control inhibition time computing part 8Bb_L1 calculates first control inhibition time Tmask_L1 based on time tTSIG_L passed since detection of a direction instruction operation, with a first control inhibition time computing map taken as a reference.

In this example, for the first control inhibition time computing map, the ordinate represents first control inhibition time Tmask_L1, and the abscissa represents time tTSIG_L. The map shows that until time tTSIG_L becomes a prescribed time t1, control inhibition time Tmask_L1 has a maximum value, while in the region where time tTSIG_L is past prescribed time t1, control inhibition time Tmask_L1 decreases as time tTSIG_L becomes longer.

Second control inhibition time computing part 8Bb_L2 calculates second control inhibition time Tmask_L2 based on steering angle operation variation quantity $\Delta\delta$, with a second control inhibition time computing map taken as a reference.

In this example, for the second control inhibition time computing map, the ordinate represents second control inhibition time Tmask_L2, and the abscissa represents steering angle operation variation quantity $\Delta\delta$. The map shows that until leftward steering angle operation variation quantity $\Delta\delta$ becomes prescribed quantity $\Delta\delta 1$, control inhibition time Tmask_L2 has a maximum value, while in the region where leftward steering angle operation variation quantity $\Delta\delta$ is smaller than prescribed quantity $\Delta\delta 1$, control inhibition time Tmask_L2 decreases as $\Delta\delta$ becomes smaller (as $|\Delta\delta|$ becomes larger). Also, as the rightward steering angle varies ($\Delta\delta>0$), control inhibition time Tmask_L2 takes the minimum value.

Third control inhibition time computing part 8Bb_L3 calculates third control inhibition time Tmask_L3 based on yaw rate variation quantity $\Delta\phi'$, with a third control inhibition time computing map taken as a reference.

In this example, for the third control inhibition time computing map, the ordinate represents third control inhibition time Tmask_L3, and the abscissa represents yaw rate variation quantity $\Delta\phi'$. The map shows that until leftward yaw rate variation quantity $\Delta\phi'$ becomes prescribed quantity $\Delta\phi'1$, control inhibition time Tmask_L3 has a maximum value, while in the region where leftward yaw rate variation quantity $\Delta\phi'$ is smaller than prescribed quantity $\Delta\phi'1$, control inhibition time Tmask_L3 decreases as $\Delta\phi'$ becomes smaller (as $|\Delta\phi'|$ becomes larger). Also, as the rightward yaw rate variation varies ($\Delta\phi'>0$), control inhibition time Tmask_L3 takes the maximum value.

Fourth control inhibition time computing part 8Bb_L4 calculates fourth control inhibition time Tmask_L4 based on time tANGLE_L after the viewing direction of the driver becomes lower than the aforementioned lane change determination angle, with a fourth control inhibition time computing map taken as a reference.

In this example, for the fourth control inhibition time computing map, the ordinate represents fourth control inhibition time Tmask_L4, and the abscissa represents time tANGLE_L. The map shows that until time tANGLE_L becomes prescribed time t2, control inhibition time Tmask_L4 has a maximum value, while in the region where time tANGLE_L is over prescribed time t2, control inhibition time Tmask_L4 decreases as time tANGLE_L becomes longer.

Here, a lower limit is set for each of first control inhibition time Tmask_L1 through fourth control inhibition time Tmask_L4.

First control inhibition time Tmask_L1 through fourth control inhibition time Tmask_L4 are input to control inhibition time computing part 8Bb-L5, and control inhibition time computing part 8Bb-L5 outputs control inhibition time Tmask_L. Here, by integrating first control inhibition time Tmask_L1 through fourth control inhibition time Tmask_L4, control inhibition time Tmask_L is calculated.

Similarly, control inhibition time Tmask_R becomes smaller as time tTSIG_R becomes longer, as rightward steering angle operation variation quantity $\Delta\delta$ becomes larger, as rightward yaw rate variation quantity $\Delta\phi'$ becomes larger, and as time tANGLE_R becomes longer.

In this way, the higher the probability that the driver will change lanes, the shorter control inhibition time Tmask_L and control inhibition time Tmask_R will be.

As shown in FIGS. 3, 9 and 10, after determination on start of vehicle movement control in step S90, during the period of control inhibition time Tmask_L or control inhibition time Tmask_R, control start is inhibited. Also, after determination of start of alarm generation control in step S100, during the period of control inhibition time Tmask_L or control inhibition time Tmask_R, control start is inhibited.

As a result, too early ON of alarm and control that would give the driver a feeling of discomfort can be suppressed.

In the embodiments described above, one may alternatively adopt the following scheme. In step S3502 shown in FIG. 5, the intention of the driver to change lanes (the intention of the driver to enter the lane of the obstacle) can be detected based on the steering input of the driver. In this case, first, based on steering angle $\delta$ detected with the steering angle detecting means (steering angle sensor 19), a steering angle operation variation quantity $\Delta\delta$ (=$\delta-\delta 0$) is calculated. Then, if steering angle operation variation quantity $\Delta\delta$ is larger than a prescribed quantity $\Delta\delta 1$, it is determined that the driver intends to change lanes. As a result, even if the driver does not manipulate the direction indicator to indicate the direction of lane change, the intention of the driver to change lanes can still be detected.

In another variation, in step S3502 shown in FIG. 5, the intention of the driver to change lanes (the intention of the driver to enter the lane of the obstacle) can be detected based on the yaw rate generated at the vehicle. In this case, first, based on yaw rate φ' detected with yaw rate detecting means (a yaw rate sensor or the like), yaw rate variation quantity Δφ' (=φ'-φ'0) is calculated. Then, if yaw rate variation quantity Δφ' is larger than a prescribed quantity Δφ'1, it is determined that the driver intends to change lanes. As a result, even if the driver does not manipulate the direction indicator to indicate the direction of lane change, the intention of the driver to change lanes can still be detected.

In yet another variation, in step S3502 shown in FIG. 5, the intention of the driver to change lanes (the intention of the driver to enter the lane of the obstacle) can be detected based on the viewing direction of the driver. In this case, first, the sight line and orientation of the face of the driver are detected as angles with the sight line detecting means (image pickup device 50). Then, if time tANGLE_L that passes after the sight line of the driver becomes lower than a prescribed lane change determination angle (<0: leftward direction) or time tANGLE_R after the sight line direction of the driver becomes over a prescribed lane change determination angle (>0: rightward direction), it is determined that the driver intends to change lanes. As a result, even if the driver does not manipulate the direction indicator to indicate the direction of lane change, the intention of the driver to change lanes can still be detected.

In each of the embodiments, the case where obstacle avoiding control is carried out by means of vehicle movement control and alarm generation control has been explained. However, one may also adopt a scheme in which either one of them controls. That is, an alarm could sound without controlling the vehicle, or the vehicle could be controlled without sounding an alarm.

As described above with respect to the embodiments, when control start determiner 8B detects that the future position of the vehicle (the future lateral position) reaches a prescribed control start position (lateral position in the width direction of the lane) or that the future position is located nearer the side of the obstacle than the control start position, it is determined that control start for obstacle avoiding control is needed. That is, the lane where the obstacle runs is defined as the moving path of the obstacle, and, when it is detected that the future position of the vehicle reaches the prescribed control start position or even nearer to the obstacle than the control start position, it is determined that the vehicle may enter the moving path of the obstacle, and control start for obstacle avoiding control is activated.

Figure 11:
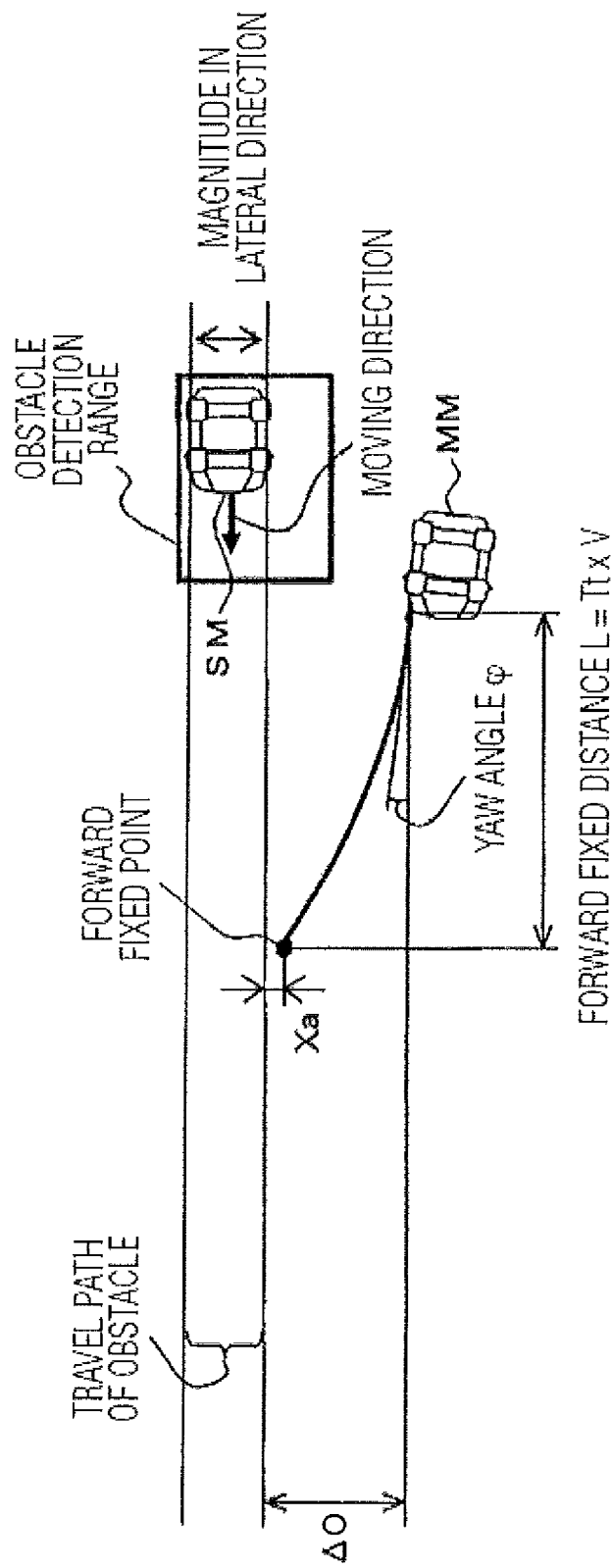
FIG. 11 is a pictorial representation of a vehicle having an operation support device, illustrating the relationship between the vehicle and an obstacle.

The method for judging that the vehicle may enter the moving path of the obstacle is not limited to this scheme. For example, as shown in FIG. 11, one may also adopt the following scheme. The position and the magnitude in the lateral direction of obstacle SM are detected, and, based on variation in the position of detected obstacle SM, the movement direction of obstacle SM is determined. At the same time, from the movement direction and magnitude in the lateral direction of obstacle SM, the moving path of obstacle SM is determined. When distance Xa between the future position of vehicle MM (the forward fixed point) and the determined moving path of obstacle SM becomes shorter than a prescribed distance, it is determined that vehicle MM may enter the moving path of obstacle SM. This scheme, as well as other appropriate schemes, may be selected as the method in judging the possibility that the vehicle may enter the moving path of the obstacle.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A vehicle operation supporting device for a vehicle travelling on a road with travel lanes comprising:
    a side obstacle detector for detecting a presence of an obstacle in a lane on a side of the vehicle;
    an intention detector that detects an intention of the driver to change from a current lane to the lane of the obstacle;
    a future position predictor that predicts a future position of the vehicle after a prescribed time passes starting from when the obstacle is detected by the side obstacle detector;
    and
    an obstacle avoiding controller configured to perform the following control:
    determine whether the vehicle may enter the lane of the obstacle based on the future position of the vehicle predicted by the future position predictor;
    determine a control start timing responsive to determining that the vehicle may enter the lane of the obstacle;
    apply obstacle avoiding control to prevent approach of the vehicle to the obstacle responsive to the control start timing; and
    shorten the control start timing of the obstacle avoiding control when the intention detector detects that the driver intends to enter the lane of the obstacle, in part by modifying at least one parameter utilized by the future position predictor or the obstacle avoiding controller
    wherein the intention of the driver to change from the current lane to the lane of the obstacle is a probability that the driver intends to enter the lane of the obstacle; and wherein the obstacle avoiding controller is configured to shorten the control start timing as the probability that the driver intends to enter the lane of the obstacle increases.

2. The vehicle operation supporting device of claim 1, wherein the obstacle avoiding controller is configured to determine whether the vehicle may enter the lane of the obstacle responsive to the future position of the vehicle reaching a prescribed lateral position in a width direction of the lane.

3. The vehicle operation supporting device of claim 1, wherein the obstacle avoiding controller is configured to apply obstacle avoiding control by controlling vehicle movement to prevent the vehicle from approaching the obstacle and by generating an alarm to a driver before controlling the vehicle movement; and wherein the obstacle avoiding controller is further configured to:
    shorten a timing of generating the alarm when the intention detector detects the intention of the driver is to change from the current lane to the lane of the obstacle.

4. The vehicle operation supporting device of claim 1, wherein the obstacle avoiding controller is configured to apply obstacle avoiding control by controlling the vehicle movement to prevent the vehicle from approaching the obstacle and by generating an alarm to a driver before controlling the vehicle movement; and wherein the obstacle avoiding controller is configured to shorten an amount of time between generating the alarm and controlling the vehicle movement when the intention detector detects the intention of the driver is to change from the current lane to the lane of the obstacle.

5. The vehicle operation supporting device of claim 4, wherein controlling the vehicle movement comprises applying a yaw moment to the vehicle.

6. The vehicle operation supporting device of claim 1, wherein modifying at least one parameter comprises increasing the prescribed time used to predict the future position of the vehicle.

7. The vehicle operation supporting device of claim 1, wherein modifying at least one parameter comprises adjusting the future position of the vehicle predicted by the future position predictor to a position closer to the obstacle in a width direction of the vehicle.

8. The vehicle operation supporting device cited in claim 1, wherein the obstacle avoiding controller is configured to determine whether the vehicle may enter the lane of the obstacle responsive to the future position of the vehicle reaching a prescribed lateral position in a width direction of the lane; and wherein
modifying at least one parameter comprises adjusting the prescribed lateral position in the width direction of the lane towards a position further from the obstacle in the width direction of the lane.

9. The vehicle operation supporting device of claim 1, wherein the obstacle avoiding controller further comprises a control start inhibitor that inhibits a start of the obstacle avoiding control during a period from the determination of control start timing until passage of a control inhibition time.

10. The vehicle operation supporting device of claim 9, wherein the obstacle avoiding controller is configured to decrease the control inhibition time as the probability that the driver intends to enter the lane of the obstacle increases.

11. The vehicle operation supporting device of claim 1, wherein the intention detector detects the intention of the driver to change from the current lane to the lane of the obstacle based on operation of a direction indicating switch.

12. The vehicle operation supporting device of claim 1, further comprising:
a steering angle detector that detects a steering angle of the vehicle; and wherein the intention detector detects the intention of the driver to change from the current lane to the lane of the obstacle based on the steering angle detected by the steering angle detector.

13. The vehicle operation supporting device of claim 1, further comprising:
a yaw rate detector that detects a yaw rate generated at the vehicle; and wherein the intention detector detects the intention of the driver to change from the current lane to the lane of the obstacle based on the yaw rate detected by the yaw rate detector.

14. The vehicle operation supporting device of claim 1, further comprising:
a viewing direction detector that detects a viewing direction of the driver; and wherein the intention detector detects the intention of the driver to change from the current lane to the lane of the obstacle based on the viewing direction detected by the viewing direction detector.

15. A vehicle operation supporting device comprising:
means for detecting a presence of an obstacle in a lane at a side of the vehicle;
means for predicting a future position of the vehicle after a prescribed time;
means for determining whether the vehicle may enter the lane of the obstacle responsive to the future position of the vehicle;
means for determining a control start timing when it is determined that the vehicle may enter the lane of the obstacle;
means for performing obstacle avoiding control to prevent approach of the vehicle to the obstacle responsive to the control start timing;
means for determining whether a driver of the vehicle intends the vehicle to enter the lane of the obstacle, wherein the intention of the driver to change from a current lane to the lane of the obstacle is a probability that the driver intends to enter the lane of the obstacle and
means for shortening the control start timing when an intention of the driver is to enter the lane of the obstacle, in part by modifying at least one parameter utilized by the future position predictor or the obstacle avoiding controller, wherein the means for performing obstacle avoiding control is configured to shorten the control start timing as the probability that the driver intends to enter the lane of the obstacle increases.

16. A computer-implemented method for vehicle operation supporting, the method performed by a microcomputer and comprising:
detecting a presence of an obstacle in a lane at a side of the vehicle;
predicting a future position of the vehicle after a prescribed time;
determining whether the vehicle may enter the lane of the obstacle responsive to the future position of the vehicle;
determining a control start timing when it is determined that the vehicle may enter the lane of the obstacle;
performing, by a vehicle control unit, obstacle avoiding control to prevent approach of the vehicle to the obstacle responsive to the control start timing;
determining whether a driver of the vehicle intends the vehicle to enter the lane of the obstacle, wherein the intention of the driver to change from a current lane to the lane of the obstacle is a probability that the driver intends to enter the lane of the obstacle; and
shortening the control start timing when an intention of the driver is to enter the lane of the obstacle; in part by modifying at least one parameter utilized by the future position predictor or the obstacle avoiding controller, and shortening the control start timing with the obstacle avoiding controller as the probability that the driver intends to enter the lane of the obstacle increases.

17. The vehicle operation supporting method of claim 16, wherein determining whether the vehicle may enter the lane of the obstacle comprises determining whether the future position of the vehicle reaches a prescribed lateral position in a width direction of the lane; and wherein modifying at least one parameter utilized by the future position predictor or the obstacle avoiding controller comprises at least one of:
adjusting the prescribed lateral position in the width direction of the lane towards a position further from the obstacle in the width direction of the lane,
increasing the prescribed time used to predict the future position of the vehicle; and
adjusting the future position of the vehicle predicted by the future position predictor to a position closer to the obstacle in a width direction of the vehicle.

18. The vehicle operation supporting method of claim 16, inhibiting a start of the obstacle avoiding control for a control inhibition time starting from the determination of the control start timing.

* * * * *